(12) United States Patent
Iwatsubo et al.

(10) Patent No.: US 7,559,240 B2
(45) Date of Patent: Jul. 14, 2009

(54) METHOD AND DEVICE FOR ASSESSING RESIDUAL SERVICE LIFE OF ROLLING BEARING

(75) Inventors: Takuzo Iwatsubo, c/o Kansai University, 3-35, Yamate-cho 3-chome, Suita-shi, Osaka, 564-8680 (JP); Isao Shiromaru, Hiroshima (JP); Makoto Tanaka, Hiroshima (JP); Yoshibobu Akamatsu, Kuwana (JP); Yoji Nagayasu, Tokyo (JP); Hideko Nagayasu, legal representative, Tokyo (JP); Shingo Boda, Higashihiroshima (JP)

(73) Assignees: Chugoku Electric Power Co., Inc., Hiroshima-shi (JP); Takuzo Iwatsubo, Suita-shi (JP)

( * ) Notice: Subject to any disclaimer, the term of this patent is extended or adjusted under 35 U.S.C. 154(b) by 211 days.

(21) Appl. No.: 10/593,580

(22) PCT Filed: Mar. 29, 2005

(86) PCT No.: PCT/JP2005/005956

§ 371 (c)(1),
(2), (4) Date: May 24, 2007

(87) PCT Pub. No.: WO2005/095919

PCT Pub. Date: Oct. 13, 2005

(65) Prior Publication Data

US 2007/0277613 A1 Dec. 6, 2007

(30) Foreign Application Priority Data

Mar. 31, 2004 (JP) ............................. 2004-102995

(51) Int. Cl.
*G01M 13/04* (2006.01)
*G01B 3/44* (2006.01)

(52) U.S. Cl. ............................. 73/593; 73/609; 73/659; 73/660; 702/34; 702/56

(58) Field of Classification Search .................. 73/593, 73/599, 600, 609, 659, 660, 662; 702/34, 702/56
See application file for complete search history.

(56) References Cited

U.S. PATENT DOCUMENTS 3,705,516 A * 12/1972 Reis ............................. 73/659

(Continued)

FOREIGN PATENT DOCUMENTS

JP          2004-3891          1/2004

(Continued)

OTHER PUBLICATIONS

"Equipment diagnosis by the practice vibrating method;" P64; 1998; pp. 182-184 with Cover Sheets and end sheet (6 sheets total.).

*Primary Examiner*—Hezron L. Williams
*Assistant Examiner*—J M Saint Surin
(74) *Attorney, Agent, or Firm*—Edwards Angell Palmer & Dodge LLP

(57) ABSTRACT

Degradation of the lubricant due to contamination of the lubricant with wear particles or moisture, which greatly affects the service life of rolling bearings, can be detected in a cost-effective manner through the use of a resonance frequency band signal or high-frequency signal of an accelerometer, and the service life of a rolling bearing can be estimated with high precision at an early stage on the basis of the detected state of the wear particles and lubricant.

32 Claims, 10 Drawing Sheets
(1 of 10 Drawing Sheet(s) Filed in Color)

U.S. PATENT DOCUMENTS

| | | | | |
|---|---|---|---|---|
| 5,042,295 | A * | 8/1991 | Seeley | 73/112.03 |
| 5,058,434 | A * | 10/1991 | Zaschel | 73/659 |
| 5,109,700 | A * | 5/1992 | Hicho | 73/660 |
| 5,477,730 | A * | 12/1995 | Carter | 73/609 |
| 6,636,813 | B1 * | 10/2003 | Isobe et al. | 702/34 |
| 6,694,285 | B1 * | 2/2004 | Choe et al. | 702/182 |
| 6,711,952 | B2 * | 3/2004 | Leamy et al. | 73/579 |
| 6,763,312 | B1 * | 7/2004 | Judd | 702/56 |
| 6,926,445 | B2 * | 8/2005 | Sato et al. | 384/448 |
| 7,006,953 | B2 * | 2/2006 | Takemura et al. | 703/2 |
| 7,241,053 | B2 * | 7/2007 | Sato et al. | 384/448 |
| 7,305,330 | B2 * | 12/2007 | Urakami et al. | 703/6 |
| 2005/0246150 | A1 * | 11/2005 | Shiromaru et al. | 703/7 |

FOREIGN PATENT DOCUMENTS

WO     WO 03/106960 A1     12/2003

* cited by examiner

METHOD AND DEVICE FOR ASSESSING RESIDUAL SERVICE LIFE OF ROLLING BEARING

TECHNICAL FIELD

The present invention relates to a method for assessing residual service life of a rolling bearing and to a residual service life assessment device for estimating the remaining service life of a rolling bearing of a pump or fan or a rolling bearing used in a motor for driving these devices as auxiliary machines used in a chemical plant, a steel plant, a power plant, or other facility.

BACKGROUND ART

In rolling bearings of pumps and fans that are auxiliary devices used in chemical plants, steel plants, power plants, and other facilities, or in the rolling bearings used in motors for driving these devices, the loads are extremely small, being 5% or less of the rated load, and metal fatigue does not occur therein under normal service conditions. Therefore, the service life of these rolling bearings is affected by two types of failures that include "spalling due to concentrated stress" in portions where there is a buildup of asperities due to contamination with impurities, and "increased vibration" due to an increase in the roughness of the surface of the orbit of the rolling bearing when the lubricating film of grease is broken by moisture contamination.

A variety of methods have been proposed for assessing residual service life of these rolling bearings. Examples include methods whereby the vibration of a bearing is measured using an accelerometer signal, and a warning is issued when the bearing vibration value exceeds an allowable value, such as the "bearing assessment method" of Patent Reference 1; the acoustic emission (Acoustic Emission) method; and other methods. Other methods estimate the cause of a failure by analyzing the frequency of the bearing vibration. Some methods estimate service life by predicting the rate of increase in bearing vibration readings.

Patent Reference 1: Japanese Laid-open Patent Application No. 8-159151.

The most commonly used prediction method is a method for predicting the tendency towards increased bearing vibration using an accelerometer signal. These methods predict the rate of increase in vibration acceleration of bearings through the use of linear, quadratic, and exponential curves, and estimate the remaining service life of the bearings according to the time until the vibration reading reaches a preset allowable vibration value.

For example, as shown in FIG. 12, an effective value from 0 to 10 kHz is computed for an acceleration vibration waveform, and evaluation is performed by measuring two types of threshold values that include an absolute value and a relative value, and determining that the bearing under test is "normal" when the threshold value is not exceeded.

When the threshold value is exceeded, the bearing under test is determined to be "defective," and the frequency spectrum of the vibration waveform is computed. An n-fold component of the rotational speeds, such as 1N, 2N, 3N, or mN, is extracted.

Alternatively, when a determination is made that the bearing under test is "defective," then envelope processing of the absolute value and the vibration waveform obtained from LPF processing is performed, and the frequency spectrum of the enveloped waveform is computed. The bearing pass frequency components $f_{inn}$, $f_{out}$, and $f_{ball}$ are then extracted.

The cause of the defect is estimated with consideration for the size of the vibration components on the basis of these measurement results. Causes for defects include unbalance or misalignment of rolling bearings, looseness in the substructure, and other factors.

The acoustic emission method is a method of predicting residual service life that utilizes AE signals in a frequency higher than the acceleration to discover early-stage rolling bearing defects. The AE method is a method of prediction that uses AE signals, which are created when built-up strain energy is released in the form of sound as solid objects undergo deformation or breakdown. These AE signals, which are transmissions of elastic waves, are released when elastic energy is released from inside a material, not necessarily only during physical breakdown, but also when dislocation or transformation of crystal structures in a material occurs. The AE signals are processed through the use of an AE sensor while the rolling bearing is in operation, and predictions can be made regarding the rolling bearing by observing how often AE waves occur.

Using these kinds of prediction methods, unanticipated rolling bearing failures can be predicted before they actually happen, and intervals for replacing affected bearings can be estimated in advance. Thus, the "normal operation life," during which detection of irregularities in bearings occurs, and the "defective life", during which bearing overheating and fracturing occur, can be clearly defined, and the interval between the normal operation life and defective life, i.e., the residual service life, can be predicted. In the past, the timing of repairs performed on a rolling bearing was determined by determining the presence of an abnormality in a rotating machine, estimating the cause of the abnormality, and determining the severity of the abnormality. The most common kinds of statistical prediction for vibration acceleration utilize, as a parameter, readings of vibrations until fulfillment of the predicted service life, and carry out curvilinear regression using quadratic and exponential curves so as to define residual service life as the period until vibration readings reach an allowable vibration value.

DISCLOSURE OF THE INVENTION

Problems the Invention is Intended to Solve

However, with the conventional diagnosis or prediction methods described above, setting the allowable vibration value is difficult, residual service life varies greatly depending on the value thus set, and residual service life is difficult to predict with high precision. Furthermore, since the rolling bearing is already at the end of its service life by the time vibrations begin increasing, a long-term maintenance plan is difficult to create, and repairs may not be implemented in time even when the residual service life is predicted. Therefore, in practice, rolling bearings are often replaced in the early stages, despite the fact that they may not yet be close to the end of their true service life. Because of the poor precision in predicting residual service life by these methods, at actual power plants, factories, and similar facilities, it is impossible to extend the interval between inspection cycles, necessitating maintenance systems where every single bearing is replaced during set inspection times every few years. These methods have drawbacks in that they interfere with the basic purposes of maintenance, which are to reduce costs and labor.

Furthermore, although the conventional acoustic emission method described above can predict residual service life at an earlier stage than the abovementioned statistical methods that use acceleration, this method has drawbacks in that the AE (Acoustic Emission) sensor and the signal processing circuit that are used for assessments are expensive. The AE waves are also very faint, making the method prone to noise interference.

The present invention was developed to overcome the aforementioned problems. Specifically, an object of the present invention is to provide a method for assessing the residual service life of a rolling bearing and a device for assessing the residual service life of a rolling bearing that can, in a cost-effective manner, utilize signals in resonant frequency bands or signals in high-frequency bands obtained via an accelerometer in order to detect wear particle penetration into the lubricant and lubricant degradation due to moisture penetration, which have a significant effect on the service life of a rolling bearing, and that can accurately estimate the service life of a rolling bearing in an early stage based on the wear particle penetration and lubricant degradation.

Means for Solving the Abovementioned Problems

The method for assessing the remaining service life of a rolling bearing provided according to the present invention is characterized in comprising baseline data acquisition means for obtaining vibration signals by using an accelerometer (4) and using a testing device to acquire signals in a frequency band that includes resonance frequency band signals detectable at the highest sensitivity, for each specification such as model number, manufacturer name, and other specifications for a rolling bearing (3) as pertains to the relationship between the state of wear particle penetration in the rolling bearing (3) and the vibration/bearing service life, and to lubricant degradation and vibration/bearing service life; measurement means whereby an accelerometer (4) is used to obtain vibration signals for the rolling bearing (3) whose remaining service life is being assessed and which resides on a fan, a pump, or another rotating device (1, 2), for the purpose of measuring signals in a frequency band that includes resonance frequency band signals detectable at the highest sensitivity; and determination means for estimating the state of wear particle penetration and the state of lubricant degradation of the diagnostic rolling bearing (3), and computing the remaining service life of the diagnostic rolling bearing (3) by using measurement values obtained by the measurement means, determination results relating to the bearing specifications, and data obtained by the baseline data acquisition means.

This method is characterized, for example, in that the determination means computes the remaining service life of the rolling bearing (3) by using the calculated service life of the rolling bearing (3) and vibration values computed as a result of processing the measured waveform of vibration of the diagnostic rolling bearing (3).

In this method, the determination means makes a determination regarding the model number, manufacturer name, and other bearing specifications for the diagnostic rolling bearing (3) after dividing a vibration waveform at 1 kHz to 6 kHz into ½-octave frequency bands to obtain a plurality of bands for the diagnostic rolling bearing (3), performing envelope processing for the waveforms of each frequency band, and computing a frequency spectrum.

In this method, the determination means divides the vibration waveform at 1 kHz to 64 kHz into ½-octave frequency bands to obtain a plurality of bands for the diagnostic rolling bearing (3), performs envelope processing for the waveforms of each frequency band, computes a frequency spectrum, and makes a determination regarding the model number, manufacturer name, and other bearing specifications; and when the model number and manufacturer name of the diagnostic bearing (3) are determined, a bearing pass frequency is calculated from the bearing specifications, pass frequency components (the three components $f_{inn}$, $f_{out}$, $f_{ball}$) are extracted from the enveloped spectrum of each frequency band, relative sensitivities (ratios to normal) of the extracted pass frequency components in each frequency band are computed, the relative sensitivities of the pass frequency components are averaged over the upper bands selected from the divided data bands, a determination is made as to whether any of the upper-band averages of the pass frequency components in the divided bands exceed a threshold value, and an estimation of "normal" is made when the threshold value is not exceeded.

In the determination means, the vibration waveform at 5 kHz to 35 kHz is divided into ½-octave frequency bands to obtain a total of 6 bands for the diagnostic bearing (3), envelope processing is performed for the waveforms of each frequency band, and a frequency spectrum is computed.

The threshold value in the determination means is a number greater than 1.

In this method, the determination means divides the vibration waveform at 1 kHz to 64 kHz into ½-octave frequency bands to obtain a plurality of bands for the diagnostic rolling bearing (3), performs envelope processing for the waveforms of each frequency band, computes a frequency spectrum, and makes a determination regarding the model number, manufacturer name, and other bearing specifications; and when the model number and manufacturer name of the diagnostic rolling bearing (3) are not determined, a frequency spectrum peak in the range of 1.6-7 times the rotational speed is extracted from the enveloped spectrum of each frequency band, relative sensitivities (ratios to normal) of the peak frequency components of each extracted frequency band are computed, the relative sensitivities of the peak frequency components are averaged over the top three bands, a determination is made as to which relative sensitivity average of the upper bands obtained by dividing peak frequency components exceeds a threshold value, and an estimation of "normal" is made when the threshold value is not exceeded.

In this method, the determination means divides the vibration waveform at 5 kHz to 35 kHz into ½-octave frequency bands to obtain a total of 6 bands for the diagnostic rolling bearing (3), performs envelope processing for the waveforms of each frequency band to compute a frequency spectrum, and makes a determination regarding the model number, manufacturer name, and other bearing specifications; and when the model number and manufacturer name of the diagnostic rolling bearing (3) are not determined, a frequency spectrum peak in the range of 1.6-7 times the rotational speed is extracted from the enveloped spectrum of each frequency band, relative sensitivities (ratios to normal) of the peak frequency components of each extracted frequency band are computed and the relative sensitivities of the peak frequency components are averaged over the top three bands, and a determination is made as to whether the relative sensitivity average the peak frequency components over the top three bands exceeds a threshold value.

The threshold value in the determination means is a number greater than 1.

The method for assessing the remaining service life of a rolling bearing according to a system of the present invention for detecting lubricant degradation provides a method for assessing the remaining service life of a rolling bearing, characterized in comprising baseline data acquisition means for obtaining vibration signals by using an accelerometer (4) and using a testing device to acquire signals in a frequency band that includes resonance frequency band signals detectable at the highest sensitivity, as pertains to the relationship between the state of wear particle penetration in a rolling bearing (3) and the vibration/bearing service life, and to lubricant degradation and vibration/bearing service life; measurement means whereby an accelerometer (4) is used to obtain vibration signals for rolling bearings (3) whose remaining service life is being assessed and which reside on fans, pumps, or other rotating devices (1, 2), for the purpose of measuring signals in a frequency band that includes resonance frequency band signals detectable at the highest sensitivity; and determination means for estimating the state of wear particle penetration and the state of lubricant degradation of the diagnostic rolling bearing (3), and computing the remaining service life of the diagnostic rolling bearing (3) by using measurement values obtained by the measurement means, and data obtained by the baseline data acquisition means.

In this method, the determination means calculates the relative sensitivity of an effective value in two frequency bands, which are a wide band and a narrow band that includes the sensor resonance frequency band, from vibration signals having a frequency band of 1 kHz to 64 kHz for the diagnostic rolling bearing (3); determines whether a quantitative feature that is the product of the relative sensitivity of a narrow-band effective value and the relative sensitivity of the wide-band effective value exceeds a threshold value; and makes a determination of "normal" when the threshold value is not exceeded.

In this method, the determination means calculates the relative sensitivity of an effective value in the two frequency bands of 23 kHz to 32 kHz and 5 kHz to 35 kHz from vibration signals having a frequency band of 5 kHz to 35 kHz for the diagnostic rolling bearing (3); determines whether a quantitative feature that is the product of the relative sensitivity of the effective value at 23 kHz to 32 kHz and the relative sensitivity of the effective value at 5 kHz to 35 kHz exceeds a threshold value; and makes a determination of "normal" when the threshold value is not exceeded.

The threshold value in the determination means is a number greater than 1.

In the determination means, it is determined for the diagnostic rolling bearing (3) whether any of the upper-band averages of the pass frequency components in the divided bands exceed a threshold value, and when the threshold value is exceeded, a wavelet distribution of the vibration waveform is created in order to prevent misidentification of indentation/lubricant degradation, the time frequency distribution (wavelet) is displayed, and the time frequency distribution (wavelet) is confirmed by a human.

In the determination means, it is determined for the diagnostic rolling bearing (3) whether the relative sensitivity average the peak frequency components over the top three bands exceeds a threshold value, and when the threshold value is exceeded, a wavelet distribution of the vibration waveform is created in order to prevent misidentification of indentation/lubricant degradation, the time frequency distribution (wavelet) is displayed, and the time frequency distribution (wavelet) is confirmed by a human.

In the determination means, it is determined for the diagnostic rolling bearing (3) whether the product of the relative sensitivity of a wide-band effective value and the relative sensitivity of a narrow-band effective value exceeds a threshold value, and when the threshold value is exceeded, a wavelet distribution of the vibration waveform is created in order to prevent misidentification of indentation/lubricant degradation, the time frequency distribution (wavelet) is displayed, and the time frequency distribution (wavelet) is confirmed by a human.

The remaining service life in the cases of indentation-induced lubricant degradation and fatigue flaking is assessed in the determination means using a residual service life estimation equation computed as the product of the calculated service life and a residual service life coefficient from 0 to 1.

A determination is made in the determination means for the diagnostic rolling bearing (3) whether any of the upper-band averages of the pass frequency components in the divided bands exceed a threshold value, and when the threshold value is exceeded, the case of indentation-induced fatigue flaking is confirmed, the indentation size is estimated from the relative sensitivities average of the top three bands, and the remaining service life in the case of indentation-induced fatigue flaking is calculated and assessed according to the equation [Eq. (1)] below.

$$L_{10}=L_{10h}\times 10^{(0.0038d\ log(P/C)-0.272\ log(d)+0.416)} \quad [\text{Eq. (1)}]$$

A determination is made in the determination means for the diagnostic rolling bearing (3) whether the relative sensitivity average of the peak frequency components over the top three bands exceeds a threshold value, and when the threshold value is exceeded, the case of indentation-induced fatigue flaking is confirmed, the indentation size is estimated from the relative sensitivity average of the top three bands, and the remaining service life in the case of indentation-induced fatigue flaking is calculated and assessed according to the equation [Eq. (1)] below.

$$L_{10}=L_{10h}\times 10^{(0.0038d\ log(P/C)-0.272\ log(d)+0.416)} \quad [\text{Eq. (1)}]$$

In the determination means, the equation for estimating the remaining service life in the case of indentation-induced fatigue flaking is defined by letting the calculated service life be the basic dynamic service life rating in the equation [Eq. (2)] below, and letting the residual service life coefficient be the occurrence of indentations as a function of P/C and a vibration value.

$$L_{10h} = \frac{10^6}{60n}\left(\frac{C}{P}\right)^3 \quad [\text{Eq. (2)}]$$

In the determination means, the equation for estimating the remaining service life in the case of lubricant degradation is defined by letting the calculated service life be the calculated service life according to the equation [Eq. (3)] below, and letting the residual service life coefficient be the residual service life based on the occurrence of lubricant degradation as a function of the vibration value.

$$\log(L_{hb}) = -2.30 + \frac{2450}{273+t} - 0.301(S_G + S_N + S_W) \quad [\text{Eq. (3)}]$$

The determination means computes for the diagnostic rolling bearing (3) the relative sensitivity of an effective value in the sensor resonance frequency band of 23 kHz to 32 kHz and an effective value at 5 kHz to 35 kHz, and determines whether the product of the relative sensitivity of the effective value at 23 kHz to 32 kHz and the relative sensitivity of the effective value at 5 kHz to 35 kHz exceeds a threshold value, and when the threshold value is exceeded, the case of lubricant degradation is confirmed, and the remaining service life in the case of lubricant degradation is calculated and assessed according to the equation [Eq. (4)] below from the relative sensitivity of the effective value at 23 kHz to 32 kHz.

$$L=L_{hb}\times V_r^{-4.44} \quad [\text{Eq. (4)}]$$

The determination means computes a cepstrum of a vibration waveform at 1 kHz TO 64 kHz for the diagnostic rolling bearing (3), computes the kurtosis of the cepstrum, determines whether the kurtosis of the cepstrum exceeds a threshold value, determines that the case of indentation-induced fatigue flaking is in effect when the threshold value is exceeded, and assesses that the case of lubricant degradation is in effect when the threshold value is not exceeded.

The threshold value in the determination means is a number greater than 3.

When the presence of a defect of lubricant degradation or indentation-induced fatigue flaking is determined in the determination means, assessment by a human is deemed unnecessary, and a time frequency distribution (wavelet) is not displayed.

When a determination is made in the determination means that the case of indentation-induced fatigue flaking is in effect and the threshold value is exceeded for the diagnostic rolling bearing (3), the indentation size is estimated from the relative sensitivity average of the top three bands, the remaining service life in the case of indentation-induced fatigue flaking is assessed, and the remaining service life is expressed in units of time.

When a determination is made in the determination means that the case of lubricant degradation is in effect and the threshold value is not exceeded for the diagnostic rolling bearing (3), severity of lubricant degradation is estimated from the effective value of the diagnostic rolling bearing (3) at 23 kHz to 32 kHz, the remaining service life in the case of lubricant degradation is assessed, and the remaining service life is expressed in units of time.

In the determination means, the vibration waveform at 5 kHz to 35 kHz is measured for the diagnostic rolling bearing (3). In order to detect indentations, the band of 5 kHz to 35 kHz is divided into 6 frequency bands and an enveloped spectrum is computed; a determination is made as to whether the enveloped spectrum exceeds a threshold value, and an estimation of "normal" is made when the threshold value is not exceeded; and when the threshold value is exceeded, a defect is estimated to be present even though a type of defect/failure cannot be specified for the case of indentation-induced fatigue flaking.

In the determination means, a quantitative feature (product of an effective value at 23 kHz to 32 kHz and an effective value at 5 kHz to 35 kHz) is computed in order to detect lubricant degradation for the diagnostic rolling bearing (3), a determination is made as to whether the quantitative feature of the lubricant degradation exceeds a threshold value, and an estimation of "normal" is made when the threshold value is not exceeded; and when the threshold value is exceeded, a defect is estimated to be present even though a type of defect/failure cannot be specified for the case of lubricant degradation.

The threshold value in the determination means is 2.0.

In the determination means, the quantitative feature (kurtosis of the cepstrum) for the diagnostic rolling bearing (3) is computed in order to distinguish between indentations and lubricant degradation, and a determination is made as to whether the kurtosis of the cepstrum exceeds a threshold value; when the threshold value is exceeded, a determination is made that there is a defect of indentation-induced fatigue flaking; and when the threshold value is not exceeded, an estimate is made that there is a defect of lubricant degradation.

The threshold value in the determination means is 3.8.

A determination is made in the determination means that the diagnostic rolling bearing (3) is normal when the result of detecting indentations for the diagnostic rolling bearing (3) does not exceed a threshold value, and the result of detecting lubricant degradation also does not exceed a threshold value.

A need for caution is recognized; the amount of indentations, the amount of lubricant degradation, and the identified amount of indentations/lubrication are specified; and a time frequency distribution (wavelet) is displayed in the determination means when the type of failure cannot be specified and the result of detecting indentations for the diagnostic rolling bearing (3) exceeds a threshold value, or when the type of failure cannot be specified and the result of detecting lubricant degradation exceeds a threshold value; and the type of failure is determined and assessed by a human.

A determination is made in the determination means that there is a defect of indentation-induced fatigue flaking, a determination is made that indentation has occurred, and the remaining service life in the case of indentation-induced fatigue flaking is assessed when the result of detecting indentations for the diagnostic rolling bearing (3) exceeds a threshold value, and the kurtosis of the cepstrum exceeds a threshold value.

A determination is made in the determination means that there is a defect of lubricant degradation, a determination is made that lubricant degradation has occurred, and the remaining service life in the case of lubricant degradation is assessed when the result of detecting lubricant degradation for the diagnostic rolling bearing (3) exceeds a threshold value, and the kurtosis of the cepstrum does not exceed a threshold value.

A need for caution is recognized; the amount of indentations, the amount of lubricant degradation, and the identified amount of indentations/lubrication are specified; a time frequency distribution (wavelet) is displayed; and the type of failure is determined and assessed by a human in the determination means when there is a defect of indentation-induced fatigue flaking, or a determination is made that there is a defect of lubricant degradation in the diagnostic rolling bearing (3).

The threshold value for detecting indentations and lubricant degradation in the determination means is varied according to (a) the BRG size, (b) machine weight, (c) electric motor output, (d) machine type, and (e) a combination of factors (a) through (d)

Conventional failure detection means for assessing machine unbalance and misalignment, loose substructures, and the like by frequency analysis is provided in addition to detecting indentations and lubricant degradation in the determination means for comprehensively assessing all rotating machine failures.

The device for assessing remaining service life provided according to the present invention is characterized in comprising an accelerometer (4) for measuring vibration signals relating to a diagnostic rolling bearing (3) whose remaining service life is being assessed, an analog/digital converter (5) for converting data obtained via the accelerometer (4), a quantitative feature extraction unit (6) for extracting characteristics of indentation and lubricant degradation from vibration signals converted by the analogue/digital converter (5); a measurement results database (7) in which are stored baseline data that record the relationship of wear particle penetration to vibration and bearing service life, and the relationship of lubricant degradation to vibration and bearing service life in the rolling bearing (3); vibration data obtained during normal fatigue of the diagnostic rolling bearing (3) residing on a mechanical rotating device (1, 2), such as a pump or a fan; and data related to bearing load, speed of rotation, operating time, and rolling bearing designation; a residual service life assessment unit (8) that, utilizing data stored in the measurement results database (7), determines wear particle penetration levels and lubricant degradation levels in the diagnostic rolling bearing (3) on the basis of vibration signals from the diagnostic rolling bearing (3) extracted via the quantitative feature extraction unit (6) to assess residual service life; and an assessment results display (9) for displaying the results from the residual service life assessment unit (8).

Effect of the Invention

In the assessment method configured as described above, baseline data acquired by the testing device concerning the relationship of bearing acceleration to wear particle intrusion and the relationship of the acceleration to the lubricant state are acquired in advance in the baseline data acquisition means for the state of formation of indentations in the rolling bearings that occur when the lubrication degrades due to contamination with wear particles or degradation of the lubricant. In the measurement means, vibration signals are obtained, and resonance frequency band signals or high-frequency signals detectable at the highest sensitivity are measured using the accelerometer (4) for a diagnostic rolling bearing (3) residing on a rotating device (1, 2) for the purpose of assessing the remaining service life.

The states of wear particle contamination and lubricant degradation of the diagnostic rolling bearing (3) are then estimated, and the remaining service life of the diagnostic rolling bearing (3) is computed in the determination means using the measured values obtained by the measurement means, the data obtained by the baseline data acquisition means, and vibration data relating to the bearing load in the normal state of the diagnostic rolling bearing (3) measured in advance, to the rotational speed, the operation time, and to the rolling bearing designation.

In this determination means, it is first determined, by computing the increase in vibration, whether the diagnostic rolling bearing (3) is in an early stage or a late stage of degradation.

When a determination is made that the bearings are in an early stage of degradation, further determination is performed as follows. First, a determination is made as to whether the diagnostic rolling bearing (3) has a normal degree of degradation, is contaminated with wear particles to a certain degree, or has undergone lubricant degradation to a certain degree. The determination is made using the resonance frequency band signals or high-frequency band signals of the accelerometer (4) for the diagnostic rolling bearing (3) obtained in the measurement means, and the pre-measured vibration data during normal operation of the diagnostic rolling bearing (3).

The rated service life is computed as the remaining service life when a determination is made that the diagnostic rolling bearing (3) is not contaminated with wear particles, there is no lubricant degradation, and the bearings are in a normal state albeit in an initial stage of degradation. Then, when a determination is made that the diagnostic rolling bearing (3) is contaminated with wear particles and is in an initial stage of degradation, the size of the penetrated wear particles is estimated from the vibration data in the baseline data acquisition means, and the remaining service life is computed. Furthermore, when the lubricant of the diagnostic rolling bearing (3) has deteriorated, the bearings are determined to be in an initial stage of degradation, the degradation of the lubricant is estimated from the vibration data in the data acquisition means, and the remaining service life is computed.

Lastly, when a late stage of degradation is determined, the remaining service life is computed based on the increase of the low-frequency band vibration of the acceleration. At this time, the remaining service life can be computed with higher precision in the assessment method of the present invention not only by predicting increases in vibration, but also by observing the time elapsed until a sharp increase in acceleration occurs after wear particle contamination or lubricant degradation.

The present invention thus enables replacement periods to be defined and more efficient maintenance of devices (1, 2) to be performed by estimating the service life of a rolling bearing (3) while rotating devices (1, 2) are in service. For rotating devices (1, 2) in an electrical power plant, for example, a schedule can be easily implemented to replace the rolling bearing (3) in autumn instead of summer, where operating rates are higher, enabling more efficient maintenance. Further, traditional methods of assessing residual service life lack precision. Therefore, the present invention makes it possible to predict residual service life earlier for machinery with rotating elements that require regular inspection. Accordingly, the interval between regular inspections can be extended, and data related to the degradation of rolling bearings can be made more readily available. A more efficient system of maintenance can thus be anticipated when moving from a traditional system of regularly scheduled inspections to a maintenance system based on the specific condition of each machine.

The present invention in particular enables the remaining service life to be accurately assessed on the basis of the characteristics of the bearings by determining the model number, manufacturer name, and other specifications of a diagnostic rolling bearing (3) whose remaining service life is to be assessed. Specifically, it is possible to determine from subsequent measurement of characteristics whether a threshold value is exceeded, and the difference between a normal state and a defective state can be determined and estimated on the basis of whether the model number and manufacturer name of the diagnostic rolling bearing (3) can be determined.

It is also determined according to the present invention whether a defect in the diagnostic rolling bearing (3) is caused by indentations or lubricant failure, and the remaining service life is accurately determined. For example, when a case of indentation-induced fatigue flaking is estimated to be in effect, the size of the indentations can be estimated based on a prescribed mathematical formula to assess the remaining service life. When case of lubricant degradation is estimated to be in effect, the severity of lubricant degradation can be estimated based on a prescribed mathematical formula to assess the remaining service life.

When it is difficult to distinguish whether a defect is caused by indentation-induced fatigue flaking or lubricant degradation, the remaining service life can be reliably assessed by allowing a human to confirm the time frequency distribution (wavelet) in order to prevent misidentification.

Making a comprehensive determination of both types of defects including indentation-induced fatigue flaking and lubricant degradation in this manner enables a more precise assessment of the remaining service life of a rolling bearing (3). The method for assessing the remaining service life of a rolling bearing according to the present invention may be combined with a conventional detection method for detecting unbalance, misalignment, and loose substructures.

The device for assessing remaining service life as comprised above uses signals from an accelerometer (4) in a resonant frequency band or high frequencies to detect, in a cost-effective manner, lubricant contamination by wear particles and lubricant degradation, and in the early stages accurately estimates the service life of a rolling bearing (3) on the basis of the detected state of wear particles and the lubricant state.

The present invention, accordingly, regularizes replacement cycles or replacement intervals through the use of an output unit for inspection schedules and diagnostic reports (10), enabling more efficient maintenance of devices, because the remaining service life of rolling bearings (3) residing on mechanical rotating devices (1, 2) can be estimated while the device is in operation. For instance, a schedule can be easily implemented to replace rolling bearings (3) residing on mechanical rotating devices (1, 2) in power plants in autumn, instead of summer, where operating rates are higher. Further, for machinery where traditionally regular inspection could not be avoided, the present invention makes it possible to predict remaining service life earlier, meaning the interval between regular inspections can be extended, and data related to the degradation of rolling bearings can be made more readily available. A more efficient system of maintenance can therefore be anticipated when moving from a traditional system of regularly scheduled inspections to a maintenance system based on the specific condition of each machine.

BRIEF DESCRIPTION OF THE DRAWINGS

The patent or application file contains at least one drawing executed in color. Copies of this patent or patent publication with color drawing(s) will be provided by the Office upon request and payment of the necessary fee.

FIG. 10A shows a normal state; FIG. 10B shows a state in which indentation has occurred; and FIG. 10c shows a state in which lubricant degradation has occurred;

KEY TO SYMBOLS

Figure 1:
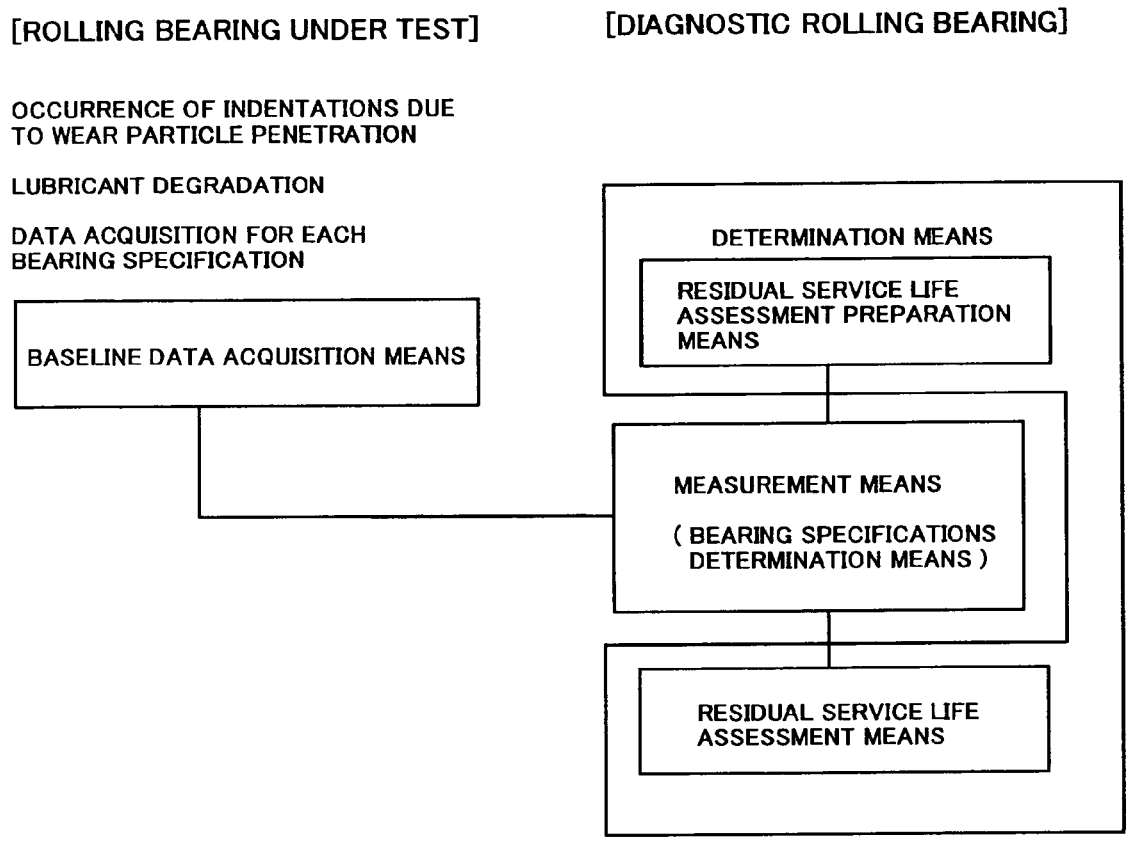
FIG. 1 is a block diagram illustrating the method for assessing the remaining service life of a rolling bearing according to the present invention.

1 pump, fan
2 electric motor
3 rolling bearing (diagnostic rolling bearing)
4 accelerometer
5 analog/digital converter
6 quantitative feature extraction unit
7 measurement results database
8 remaining service life assessment unit
9 assessment results display
10 inspection schedule/diagnostic report output unit
11 transmission modem
12 printer

BEST MODE FOR CARRYING OUT THE INVENTION

The method for assessing the remaining service life of a rolling bearing according to the present invention comprises baseline data acquisition means for using a testing device to acquire data in advance as pertains to the relationship of the wear particle penetration state/lubricant degradation state to vibration/service life; measurement means for measuring signals in a resonance frequency band or high-frequency signals of a rolling bearing used to assess the remaining service life of rolling bearings residing in a pump, fan, or other rotating device or rotating component of an electric motor; and determination means for determining the remaining service life of the diagnostic rolling bearing.

First Embodiment

Preferred embodiments of the present invention will be described hereinafter with reference to the drawings.

Figure 2:
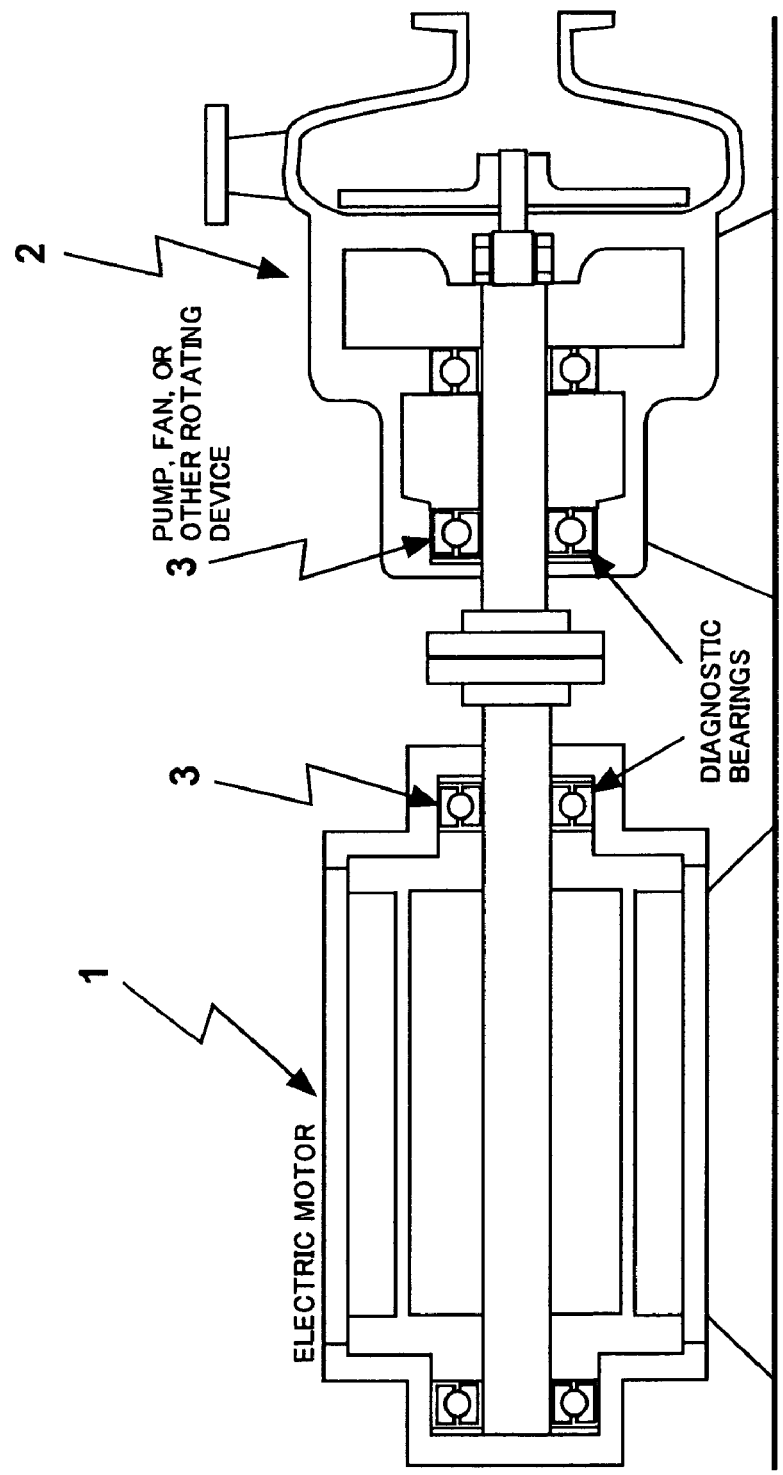
FIG. 2 is a sectional view of an example of rolling bearings residing on an electric motor and a rotating device as the objects for assessment according to the method for assessing remaining service life.

FIG. 1 is a block diagram illustrating the method for assessing the remaining service life of a rolling bearing according to the present invention. FIG. 2 is a sectional view of an example of rolling bearings residing on an electric motor and a rotating device as the objects for assessment according to the method for assessing remaining service life.

To obtain baseline data in the baseline data acquisition means, scratches are made directly on the rolling contact surfaces of disassembled bearings to simulate wear particle penetration, resulting in the appearance of indentations on the bearings. To simulate lubricant degradation, bearings having reduced lubricant volumes are then used in tests with a load testing device. An alternative method for simulating wear particle penetration is to introduce a foreign substance into the lubricant in place of wear particles. Possible variations include volume or size of the foreign substance, as well as viscosity or elasticity of the foreign substance. Similarly, methods for simulating lubricant degradation include using lubricant that has undergone oxidative reduction and introducing water into the lubricant.

In the baseline data acquisition means, data are obtained regarding the relationship between acceleration and indentation size for the state in which indentations are formed on the rolling bearing 3 when lubricant has already undergone degradation due to wear particle penetration or lubricant degradation. The main types of degradation that the rolling bearing 3 can undergo include two degradation types that include fatigue flaking that originates internally and fatigue flaking that originates on the surface. Fatigue flaking originating internally occurs when the repeated stress that occurs on the surface of a rolling element becomes focalized in the sublayers of a rolling element, and results in flakes originating from below the surface. Fatigue flaking originating on the surface occurs when penetration of wear particles and other foreign matter into the lubricant leads to spalling on the rolling contact surface, and results in flakes originating on the surface. The inherent service life of a bearing is the service life in the case of fatigue flaking originating internally. Advances in material technology in recent years have extended the service life of bearings from several times longer to dozens of times longer than their rated service lives. However, the service life in the case of fatigue flaking originating on the surface resulting from penetration of the lubricant by foreign substances is notably shorter, and is several times to dozens of times shorter than the service life in the case of fatigue flaking originating internally.

Rolling bearings 3 thus undergo various types of degradation, and it is vital that these degradation types and failure mechanisms be considered when remaining service life of a bearing is assessed. Accordingly, the present invention considers these types of degradation in rolling bearings (3) and utilizes the baseline data acquisition means as a foundation in order to predict remaining service life earlier and more precisely than was traditionally possible.

The determination means includes a stage for preparing to assess remaining service life and a measurement means for diagnostic rolling bearings 3 whose remaining service life is to be assessed and which reside on mechanical rotating devices 1, 2. In the stage for preparing to assess remaining service life, data are obtained that relate to bearing load, rolling speed, operating time, and the rolling bearing designation for the diagnostic rolling bearing 3, and an accelerometer 4 is used to gather vibration data for normal operation. In the measurement means, an accelerometer 4 is used to obtain vibration signals for diagnostic rolling bearings 3 that are in operation, and signals in resonant frequency bands or signals in high frequency bands are measured that can be detected with the highest sensitivity.

Figure 3:
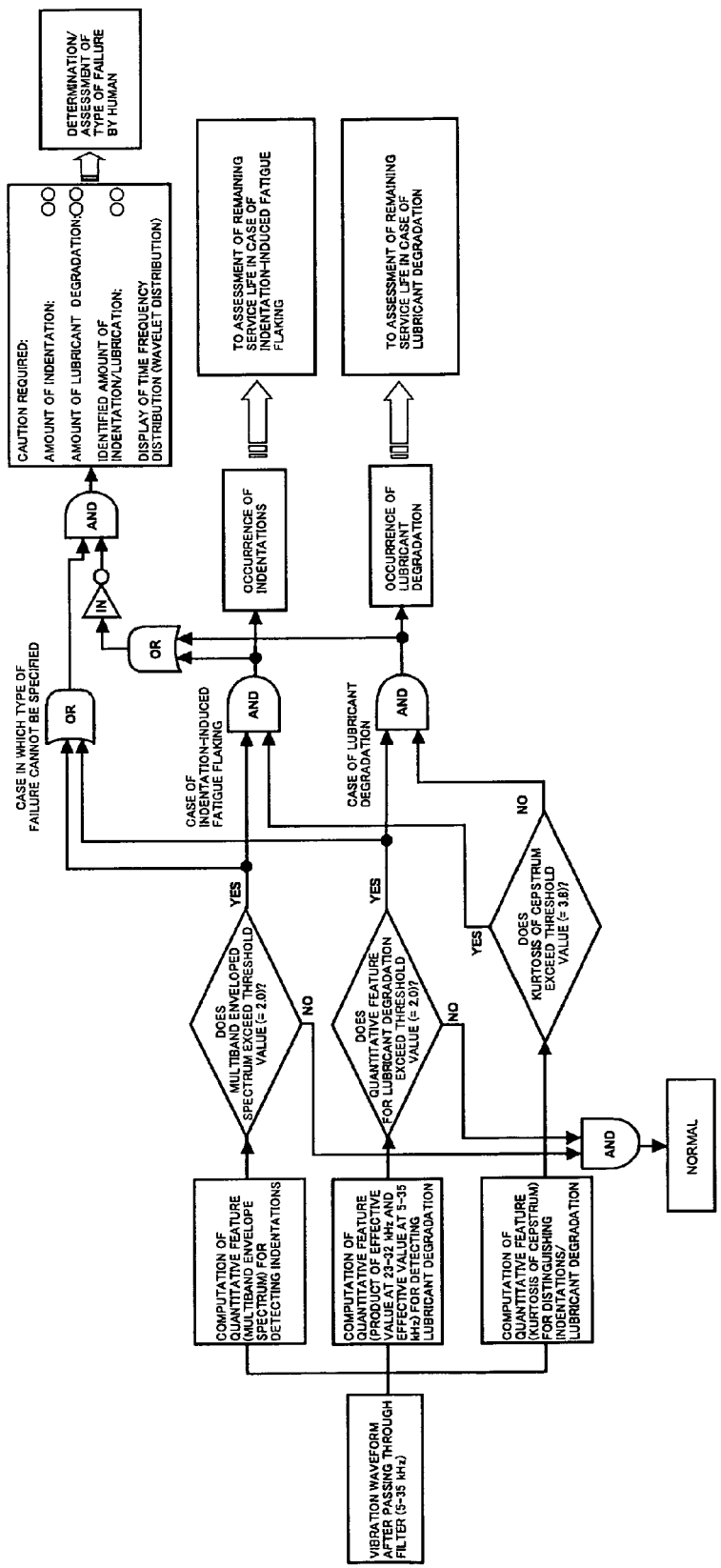
FIG. 3 is a flowchart illustrating the method for assessing the remaining service life of a rolling bearing.

FIG. 3 is a flowchart illustrating the method for assessing the remaining service life of rolling bearings.

Data obtained via the baseline data acquisition means and the stage for preparing to assess remaining service life are utilized to estimate whether diagnostic rolling bearing 3 are in an early stage of degradation or in a late stage of degradation, and to assess the remaining service life, based on a routine such as the one shown in FIG. 3.

A vibration waveform at 1 kHz to 64 kHz is measured for the diagnostic rolling bearing 3. A vibration waveform at 5 kHz to 35 kHz is preferably measured. In order to detect indentations, the aforementioned frequency band is divided into a plurality of frequency bands to extract an enveloped spectrum, and a determination is made as to whether each enveloped spectrum of the plurality of frequency bands exceeds a threshold value (=2.0). An estimation of "normal" is made when the threshold value is not exceeded. However, when the threshold value is exceeded, a determination is made that a defect of indentation-induced fatigue flaking is present, or the process proceeds to the next determination when a defect exists and the type of failure cannot be specified.

For example, the remaining service life of the rolling bearing 3 is computed and determined using the calculated service life of the rolling bearing 3 and using the vibration value computed as a result of processing the vibration measurement waveform of the diagnostic rolling bearing 3.

In order to detect lubricant degradation, a quantitative feature thereof (product of the effective value at 23 kHz to 32 kHz and the effective value at 5 kHz to 35 kHz) is computed, a determination is made as to whether a quantitative feature for lubricant degradation exceeds the threshold value (=2.0), and an estimation of "normal" is made when the threshold value is not exceeded. When the threshold value is exceeded, an estimate is made that a defect of lubricant degradation is present, or the process proceeds to the next determination when a defect exists and the type of failure cannot be specified.

A threshold value of 2.0 is preferred in this instance, but any threshold value greater than 1.0 can be used for determination. This threshold value is varied based on the size/type of the rolling bearing 3, the weight of the machine in which the bearings are used, the type of machine, the capacity (kW) of the electric device, and other factors.

In order to distinguish between indentations and lubricant degradation, a quantitative feature (kurtosis of cepstrum) is computed, a determination is made as to whether the kurtosis of the cepstrum exceeds a threshold value (=3.8), and an indentation-induced fatigue flaking defect is determined to be present when the threshold value is exceeded. When the threshold value is not exceeded, an estimate is made that a lubricant degradation defect is present.

A threshold value of 3.8 is preferred in this instance, but any threshold value greater than 3.0 can be used for determination. As mentioned above, this threshold value is varied based on the size/type of the rolling bearing 3, the weight of the machine in which the bearings are used, the type of machine, the capacity (kW) of the electric device, and other factors.

The diagnostic rolling bearing 3 is determined to be "normal" when the result of detecting indentations as described above does not exceed the threshold value, and the result of detecting lubricant degradation also does not exceed the threshold value. Even when the indentation detection result does not exceed the threshold value, the diagnostic rolling bearing 3 is determined to be defective when the results of detecting lubricant degradation are determined to indicate a defect. In the same manner, even when the result of detecting lubrication degradation does not exceed the threshold value, the diagnostic rolling bearing 3 is determined to be defective when the indentation detection results are determined to indicate a defect.

A need for caution is recognized; the amount of indentations, the amount of lubricant degradation, and the identified amount of indentations/lubrication are specified; and a time frequency distribution (wavelet) is displayed when the type of failure cannot be specified and the result of detecting indentations exceeds a threshold value, or when the type of failure cannot be specified and the result of detecting lubricant degradation exceeds a threshold value. The type of failure is also determined and assessed by a human.

A determination is made that there is a defect of indentation-induced fatigue flaking when the result of detecting indentations exceeds a threshold value, and the kurtosis of the cepstrum exceeds a threshold value. As a result, a determination is made that indentation has occurred, and the remaining service life in the case of indentation-induced fatigue flaking is assessed.

A determination is made that there is a defect of lubricant degradation when the result of detecting lubricant degradation exceeds a threshold value, and the kurtosis of the cepstrum does not exceed a threshold value. As a result, a determination is made that lubricant degradation has occurred, and the remaining service life in the case of lubricant degradation is assessed.

A need for caution is recognized; the amount of indentations, the amount of lubricant degradation, and the identified amount of indentations/lubrication are specified; and a time frequency distribution (wavelet) is displayed when a defect of indentation-induced fatigue flaking is estimated to exist, or a determination is made that there is a defect of lubricant degradation. The type of failure is determined and assessed by a human.

The amount of indentations, the amount of lubricant degradation, and the identified amount of indentations/lubrication are not specified, and a time frequency distribution (wavelet) is not displayed when a determination is made that an indentation-induced fatigue flaking defect or a lubrication degradation defect exists.

Second Embodiment

Figure 4:
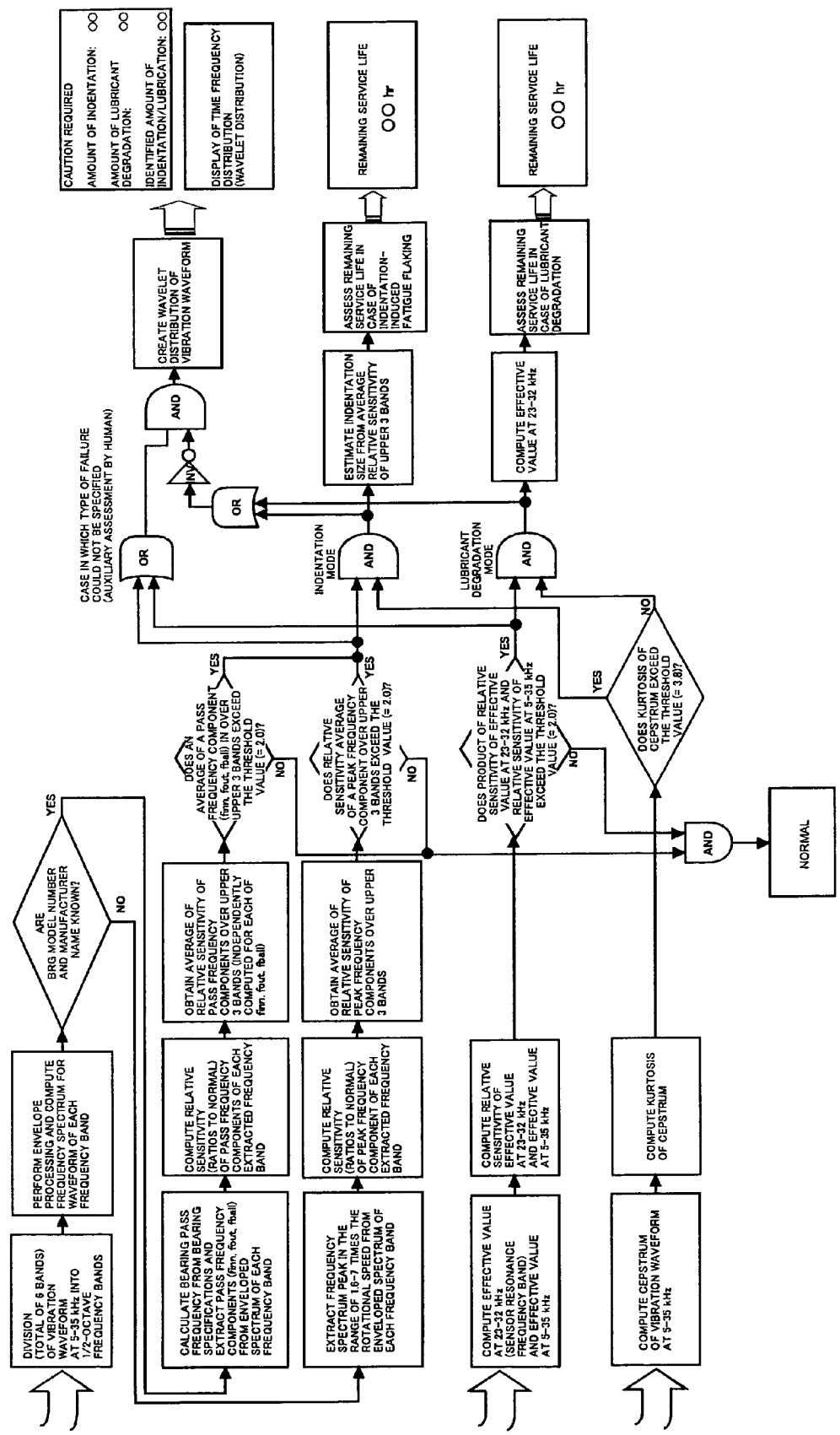
FIG. 4 is a flowchart illustrating the method for assessing the remaining service life of a rolling bearing in which the bearing specifications are determined.
Figure 5:
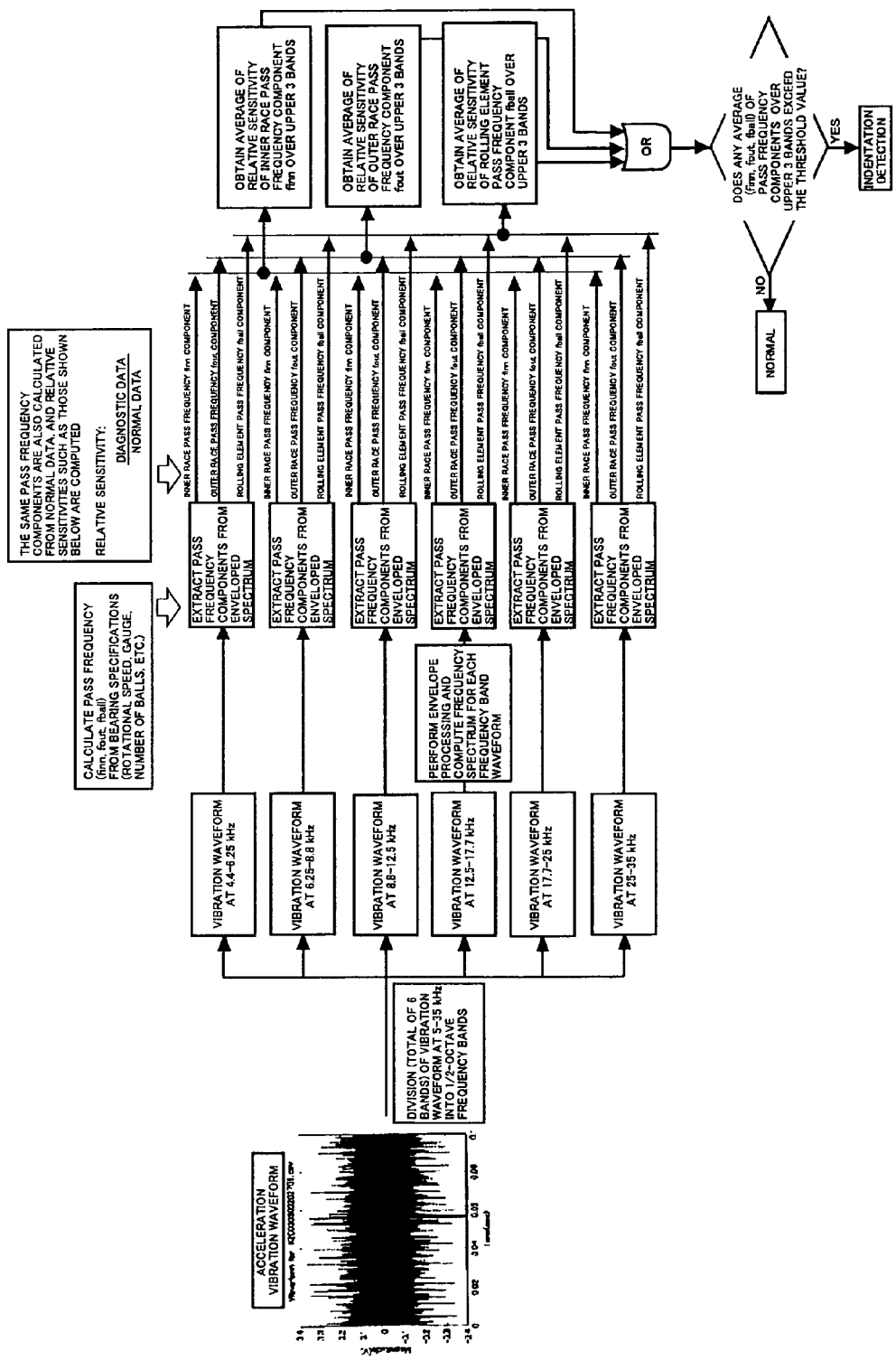
FIG. 5 is a flowchart illustrating the method for assessing the remaining service life of a rolling bearing according to a quantitative feature of indentation when the bearing specifications are determined.
Figure 6:
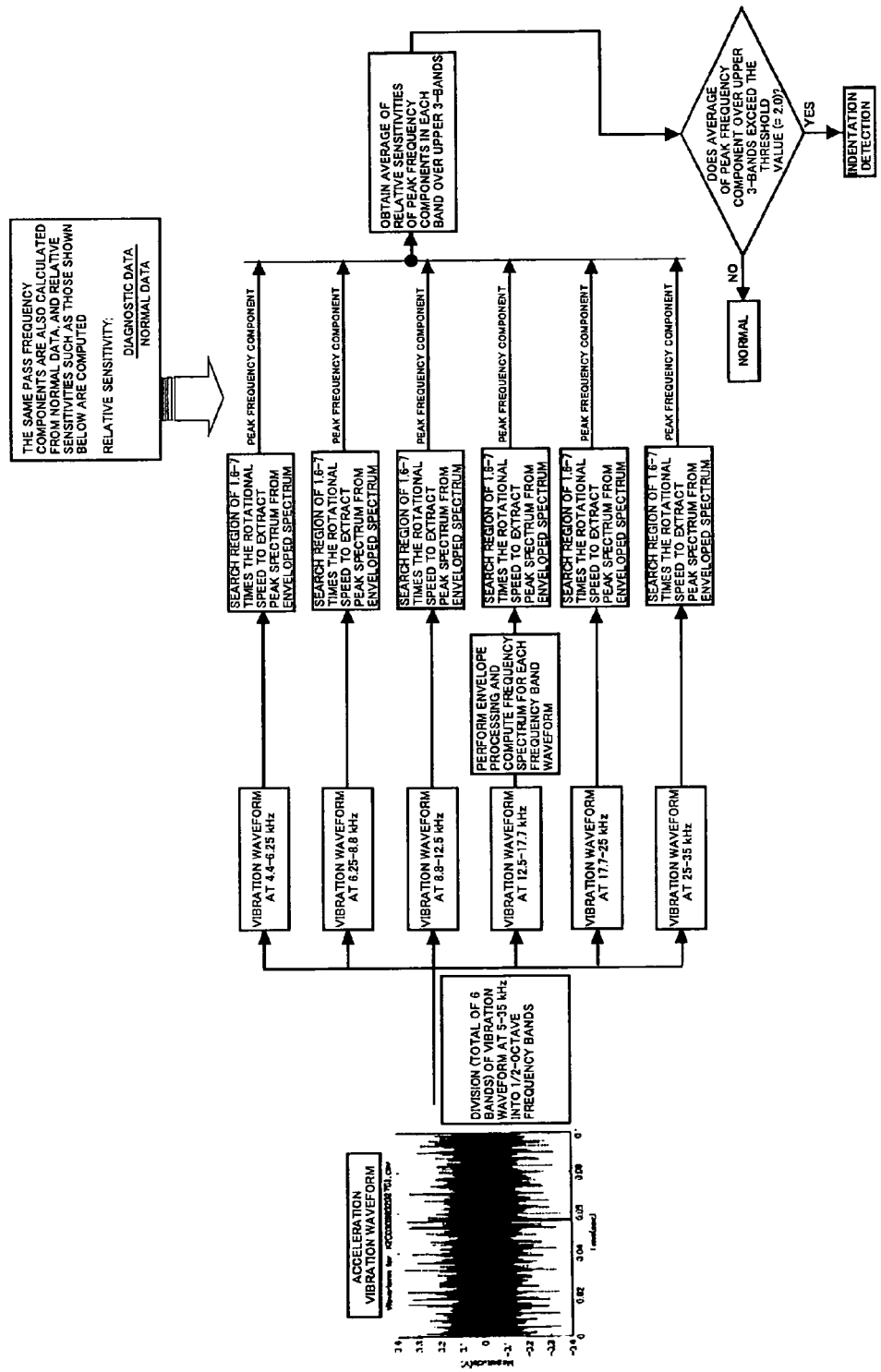
FIG. 6 is a flowchart illustrating the method for assessing the remaining service life of a rolling bearing according to a quantitative feature of indentation when the bearing specifications are not determined.

FIG. 4 is a flowchart illustrating the method for assessing the remaining service life of a rolling bearing in which the model number and name of the manufacturer of the rolling bearing of a second embodiment are determined. FIG. 5 is a flowchart illustrating the method for assessing the remaining service life of a rolling bearing according to a quantitative feature of indentation when the bearing specifications are determined. FIG. 6 is a flowchart illustrating the method for assessing the remaining service life of a rolling bearing according to a quantitative feature of indentation when the bearing specifications are not determined.

A description is provided of a method for detecting indentation that determines specifications such as the model number and the name of the manufacturer of the rolling bearing (3) of the second embodiment.

The model number and the name of the manufacturer of the diagnostic rolling bearing (3) are determined by dividing the vibration waveform at 5 kHz to 35 kHz into ½-octave frequency bands to obtain a total of 6 bands, performing envelope processing for the waveforms of each frequency band, and computing a frequency spectrum. If the model number and the name of the manufacturer of the diagnostic rolling bearing (3) can be determined, the characteristics of the bearing can be obtained, and the remaining service life can be more readily estimated.

The procedure described below is performed when the model number and the name of the manufacturer of the diagnostic rolling bearing (3) are determined.

A bearing pass frequency is calculated from the specifications of the rolling bearing (3), pass frequency components (the three components $f_{inn}$, $f_{out}$, $f_{ball}$) are extracted from the enveloped spectrum of each frequency band, relative sensitivities (ratios to normal) of the extracted pass frequency components in each frequency band are computed, and the relative sensitivities of the pass frequency components are averaged over the three upper bands. Individual calculations are performed for the three components $f_{inn}$, $f_{out}$, and $f_{ball}$. A determination is made as to whether any of the three upper band averages of the band frequency components (the three components $f_{inn}$, $f_{out}$, $f_{ball}$) have exceeded a threshold value (=2.0), and an estimation of "normal" is made if the threshold value is not exceeded.

If the threshold value has been exceeded, the time frequency distribution (wavelet) is confirmed by a human in order to prevent misidentification of indentation/lubricant degradation, a vibration waveform wavelet distribution is created, and the time frequency distribution (wavelet) is displayed. This is performed so that the human judgment can be performed with optimal precision.

The procedure described below is performed when the model number and the name of the manufacturer of the diagnostic rolling bearing (3) are not determined.

A frequency spectrum peak in the range of 1.5-7 times the rotational speed is extracted from the enveloped spectrum of each frequency band of the diagnostic rolling bearing (3), relative sensitivities (ratios to normal) of the peak frequency components of each extracted frequency band are computed, the relative sensitivities of the peak frequency components are averaged for the top three bands, an estimate is made as to whether the relative sensitivity average of the upper three bands of the peak frequency components has exceeded a threshold value (=2.0), and an estimation of "normal" is made if the threshold value is not exceeded.

If the threshold value has been exceeded, the case of indentation-induced fatigue flaking is confirmed, the indentation size is estimated from the relative sensitivity average of the upper three bands, the remaining service life in the case of indentation-induced fatigue flaking is assessed, and the remaining service life is calculated and assessed according to the equation below [Eq. 1].

$$L_{10h} = \frac{10^6}{60n}\left(\frac{C}{P}\right)^3 \qquad \text{[Eq. 1]}$$

The present invention thus enables replacement periods to be defined and more efficient maintenance of rotation devices (1, 2) to be performed by estimating the service life of the diagnostic rolling bearing (3) while the rotating devices (1, 2) are in operation. For rotating devices (1, 2) in an electrical power plant, for example, a schedule can be easily implemented to replace the rolling bearing (3) in the autumn instead of the summer, where operating rates are higher.

A fatigue test is performed by using a Rockwell hardness tester to form a conic indentation in the inner race of the rolling bearing with an indenter, and varying the size of the indentation and the load. A deep-groove ball bearing used most commonly in motors was used for a test bearing to determine the potential running time once the indentation had been formed. The test bearing that was tested using a fatigue tester fabricated by Committee 126 of the Japan Society for the Promotion of Science was a JIS 6206 bearing (inside diameter: 30 mm; outside diameter: 62 mm, width: 16 mm). The rotational speed was 2000 rpm, and the lubricant was ISOVG1O turbine oil. As shown in FIG. 1, it was evident that the service life ratio relative to the calculated service life of the rolling bearing decreased as the indentation size increased, and the percentage decrease of the service life ratio increased as the load decreased.

Figure 7:
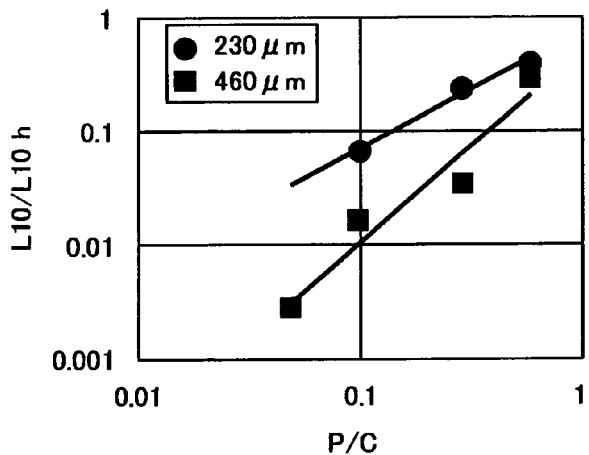
FIG. 7 is a graph showing the effect of indentation size and size on the remaining service life of a bearing.

FIG. 7 is a graph showing the effect of indentation size and load size on the service life. In the graph, P is the radial load on the bearing during the test, C is the basic dynamic load rating of the bearing, and L10h is shown in Eq. 1 as the basic dynamic service life rating according to JIS B 1518.1992. L10 indicates a 10% service life when the service life test data were applied to a Weibull distribution.

$$L_{10h} = \frac{10^6}{60n}\left(\frac{C}{P}\right)^3 \qquad \text{[Eq. 1]}$$

In the equation, n indicates the rotational speed (rpm), C represents the basic dynamic load rating of the bearing, and P is the radial load on the bearing during the test. The basic dynamic service life rating of a rolling bearing is the time required for a set of identical bearings to perform one million rotations under the same conditions, with 90% thereof exhibiting no incidence of flaking as a result of rolling fatigue.

An Eq. (Equation 2) can be confirmed from FIG. 8 in regard to indentations of each size.

$$\log(L_{10}/L_{10h}) = a \log(P/C) + b \quad \text{[Eq. 2]}$$

According to studies performed by Sayles et al., (reference: Sayles et al., ASTM STP771(1982) 255-274), a filter of 3 microns or less is provided for rolling bearings. It is known that if the cleanliness of the lubricant is controlled, the service life remains constant. The track surface of the rolling bearing is superfinished, and the surface roughness pitch is approximately 2.5 μm. Accordingly, indentations are not thought to reduce service life if the size thereof is 2.5 μm, whereas when no indentations are present, the service life of rolling bearings will exceed the basic dynamic service life rating due to the improved cleanliness of the steel used in bearings over the past several years. Systematic tests performed by the Japanese Society for the Promotion of Science have yielded two-fold increases in power. Accordingly, the relative service life when the indentation size is 2.5 μm is 2.

Coefficients a, b for a regression formula were determined based on experimental results obtained when indentation sizes of 230 μm and 460 μm were used, and on results obtained when the indentation size was 2.5 μm. Eq. 3 was obtained as a result.

$$\log(L_{10}/L_{10h}) = 0.0038d \log(P/C) - 0.272 \log(d) + 0.416 \quad \text{[Eq. 3]}$$

In the equation, d is the diameter of the indentation, and the units are microns.

The equation is modified to yield Eq. 4, which is used to estimate the remaining service life.

$$L_{10} = L_{10h} \times 10^{(0.0038d \log(P/C) - 0.272 \log(d) + 0.416)} \quad \text{[Eq. 4]}$$

The indentation size can be determined by processing the bearing vibration waveform.

If the lubricant film of the rolling bearing breaks, the oxidation degradation of the lubricant will be accelerated by the heat generated from the contacting metal parts, or by the catalytic effect caused by the abrasion powder of the contacting metal parts.

The relationship described hereinabove prevails between bearing vibration and the state of lubrication between the rotating bodies and the races of the rolling bearing, and the state of lubrication is changed. A lubrication service life test was performed, and the relationship between the relative service life and the relative vibration was determined. A test bearing and a tester were used to form indentations. The conditions were the same as with the test. The test load was 10% of the basic dynamic load rating. The test was performed in a dry state and using an ISOVG2 lubricant. The rotational speeds were 900 rpm and 1800 rpm. The results are shown in the drawing. An experimental equation between the relative service life and the relative vibration in relation to the normal state was obtained (ratio to the calculated service life obtained when the service life of a test bearing was determined from the Booser grease life equation).

A description shall be provided hereunder in regard to the method for detecting degradation of the rolling bearing lubricant.

An effective value in the sensor resonance frequency band of 23 kHz to 32 kHz is computed for the diagnostic rolling bearing (3), the relative sensitivity of an effective value at 23 kHz to 32 kHz is computed, a determination is made as to whether the relative sensitivity of the effective value at 23 kHz to 32 kHz has exceeded a threshold value (=1.5), and, if the threshold value is not exceeded, an estimation of "normal" is made.

If the threshold value has been exceeded, the case of indentation-induced fatigue flaking is confirmed, and the indentation size is estimated from the relative sensitivity average of the upper three bands. The remaining service life in the case of indentation-induced fatigue flaking is assessed. The remaining service life is calculated and assessed according to the equation below [Eq. (1)].

$$L_{10} = L_{10h} \times 10^{(0.0038d \log(P/C) - 0.272 \log(d) + 0.416)} \quad \text{[Eq. (1)]}$$

Also, if the threshold value has been exceeded, the case of lubricant degradation is confirmed, the degree of lubricant degradation is estimated from the effective value at 23 kHz to 32 kHz, the remaining service life in the case of lubricant degradation is assessed, and the remaining service life is expressed and assessed in units of time (hrs).

The cepstrum of the vibration waveform at 5 kHz TO 35 kHz is computed for the diagnostic rolling bearing (3), the kurtosis of the cepstrum is computed, a determination is made as to whether the kurtosis of the cepstrum exceeds a threshold value (=3.8), and, if the threshold value has been exceeded, a decision is made that the case of indentation-induced fatigue flaking is in effect.

An estimation of the indentation size is made from the relative sensitivity average of the three upper bands, an assessment is made of the remaining service life in the case of indentation-induced fatigue flaking, and the remaining service life is calculated and assessed by the equation below [Eq. (1)].

$$L_{10} = L_{10h} \times 10^{(0.0038d \log(P/C) - 0.272 \log(d) + 0.416)} \quad \text{[Eq. (1)]}$$

If the threshold value has not been exceeded, the case of lubricant degradation is determined to be in effect, the degree of lubricant degradation is estimated from the effective value at 23 kHz to 32 kHz, an assessment is made of the remaining service life in the case of lubricant degradation, and the remaining service life is calculated and assessed by the equation below [Eq. (2)].

$$L_{10h} = \frac{10^6}{60n}\left(\frac{C}{P}\right)^3 \quad \text{[Eq. (2)]}$$

Figure 8:
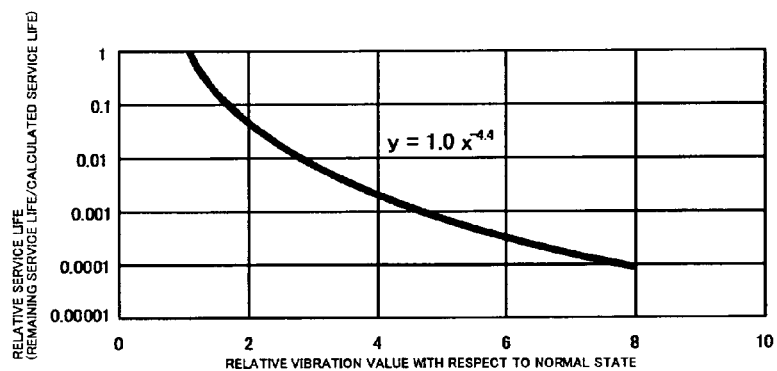
FIG. 8 is a graph showing the results of an experiment for finding the relationship between relative vibration of a bearing due to lubricant failure and remaining service life.

FIG. 8 is a graph for finding the relationship between the remaining service life and relative vibration of a bearing due to lubricant failure.

The calculated service life shown in FIG. 8 is the term Lhb in the Booser equation below [Eq. 5].

$$\log(L_{hb}) = -2.30 + \frac{2450}{273 + t} - 0.301(S_G + S_N + S_W) \quad \text{[Eq. 5]}$$

In the equation, t is the temperature of the outer bearing race (° C.), $S_G$ is the half-life subtraction coefficient according to the grease composition, and $S_N$ and $S_W$ are, respectively, the half-life subtraction coefficient according to the rotational speed and the half-life subtraction coefficient according to the load and rate. The equations are as shown in [Eq. 6] and [Eq. 7] below.

$$S_N = 0.864 \times dn/(dn_L) \quad \text{[Eq. 6]}$$

In the equation, d (mm) is the inside diameter of the bearing, nL is the catalog allowable rotational speed given in units of rpm.

$$S_W = 0.61 ndP/Cr^2 \quad [\text{Eq. 7}]$$

In the equation, P(lbf) is the load, and Cr(lbf) is the basic dynamic load rating.

Accordingly, the remaining service life is shown by the equation in Eq. 8.

$$L = L_{hb} \times V_r^{-4.44} \quad [\text{Eq. 8}]$$

If the failure mode is not specified by the results of the assessment obtained when the model number and name of the manufacturer of the rolling bearing are determined, a vibration waveform wavelet distribution is created. If the results indicate that a precaution is warranted, the degree of indentation, degree of lubrication degradation, and the indentation/lubricant differentiation amount are specified; and the time frequency distribution (wavelet) is displayed.

If a "defective" result is obtained in the case of an indentation, the size of the indentation is estimated from the relative sensitivity average of the upper three bands. The remaining service life in the case of indentation-induced fatigue flaking is assessed, and the remaining service life is displayed in units of time.

If a "defective" result is obtained in the case of lubrication degradation, the degree of lubrication degradation is estimated from the effective value at 23 kHz to 32 kHz. The remaining service life in the case of lubrication degradation is assessed, and the remaining service life is displayed in units of time.

Figure 9:
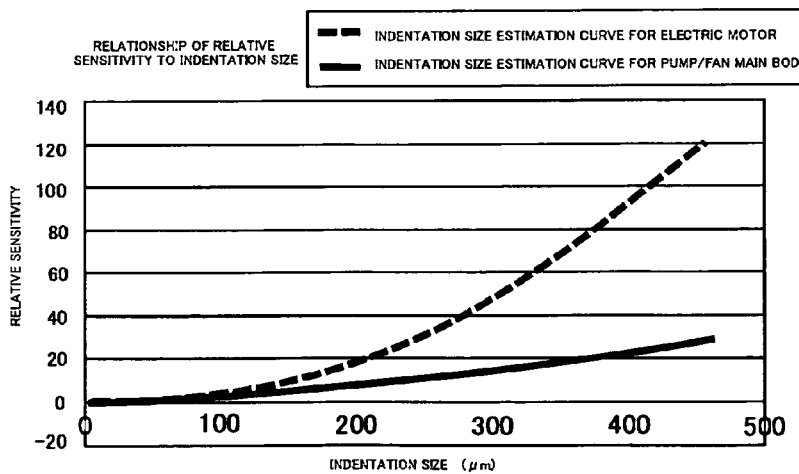
FIG. 9 is a graph showing the relationship of relative sensitivity to indentation size.

FIG. 9 is a graph showing the relationship of relative sensitivity to indentation size.

Figure 10:
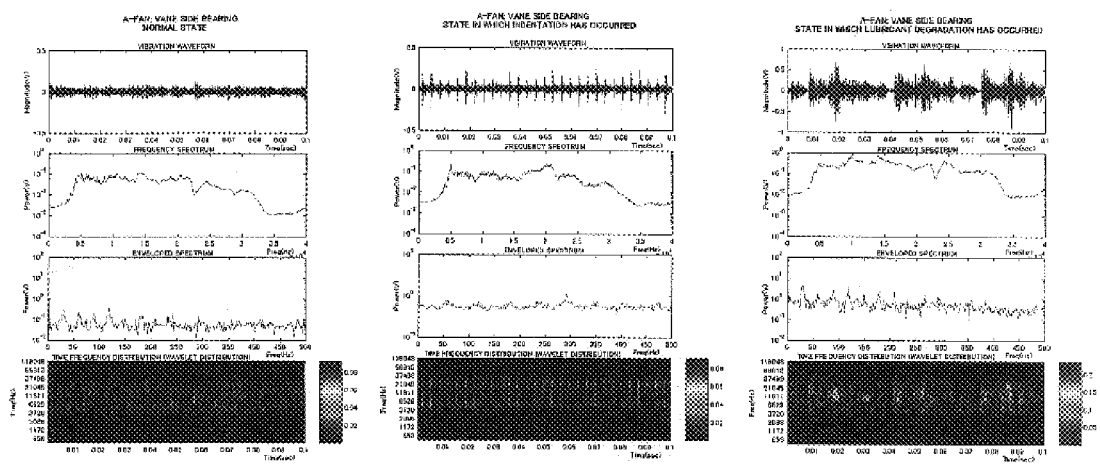
FIG. 10 shows the results of assessing the remaining service life of a rolling bearing used in an electric motor for driving a pump, wherein the waveform, the FFT spectrum, an enlargement of the FFT spectrum, and the wavelet distribution are shown in sequence from top to bottom.

In the present invention, the size and detected occurrence of indentations caused by wear particle penetration in the baseline data acquisition means, the measurement means, and the determination means can be determined using frequency bands that include vibration signals of resonance frequency bands detectable at the highest sensitivity by an accelerometer (4). As shown in FIG. 10, the indentation size estimation curve varies with the type of device and size of device, and the indentation size can be determined from the relative sensitivity that has been computed.

FIG. 10 shows the results of assessing the remaining service life of a rolling bearing used in an electric motor for driving a pump, wherein the waveform, the FFT spectrum, an enlargement of the FFT spectrum, and the wavelet distribution are shown in sequence from top to bottom. FIG. 10A shows a normal state, FIG. 10B shows a state in which indentation has occurred, and FIG. 10C shows a state in which lubricant degradation has occurred.

If the service life of a normal rolling bearing is taken to be relative service life 1 (the rated service life is taken to be relative service life 1), then the service life of a bearing with indentations is substantially smaller by comparison, and may even be 1/100 or less of the rated service life. Without exception, flaking of the diagnostic rolling bearing (3) is a source of indentations, with variance in the bearing service life known to be extremely small. The determination means of the present invention makes estimates based on the relationship between the indentation size and service life.

Third Embodiment

Figure 11:
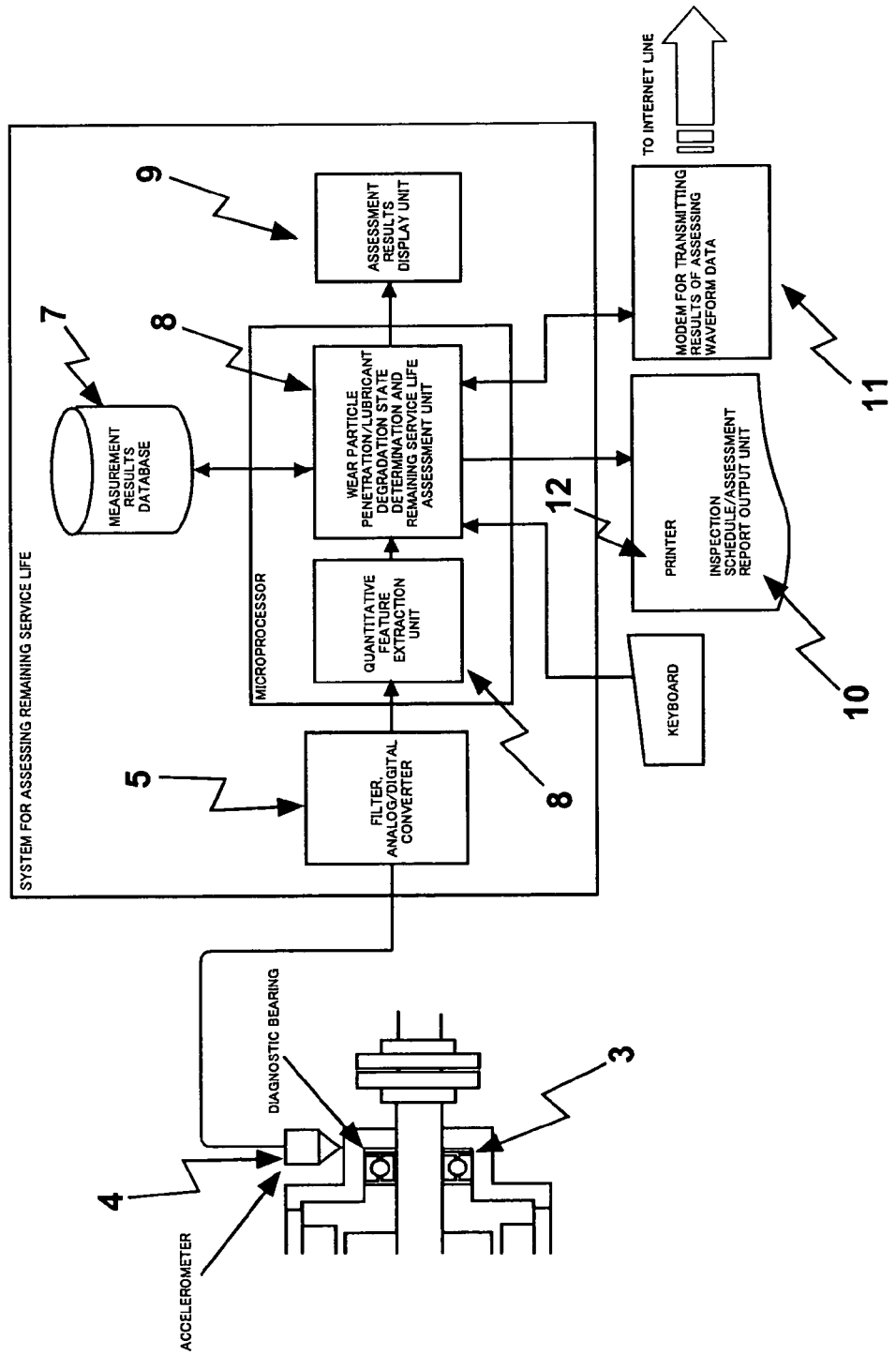
FIG. 11 is a block diagram of the structure of the device for assessing the remaining service life of a rolling bearing according to the present invention.
Figure 12:
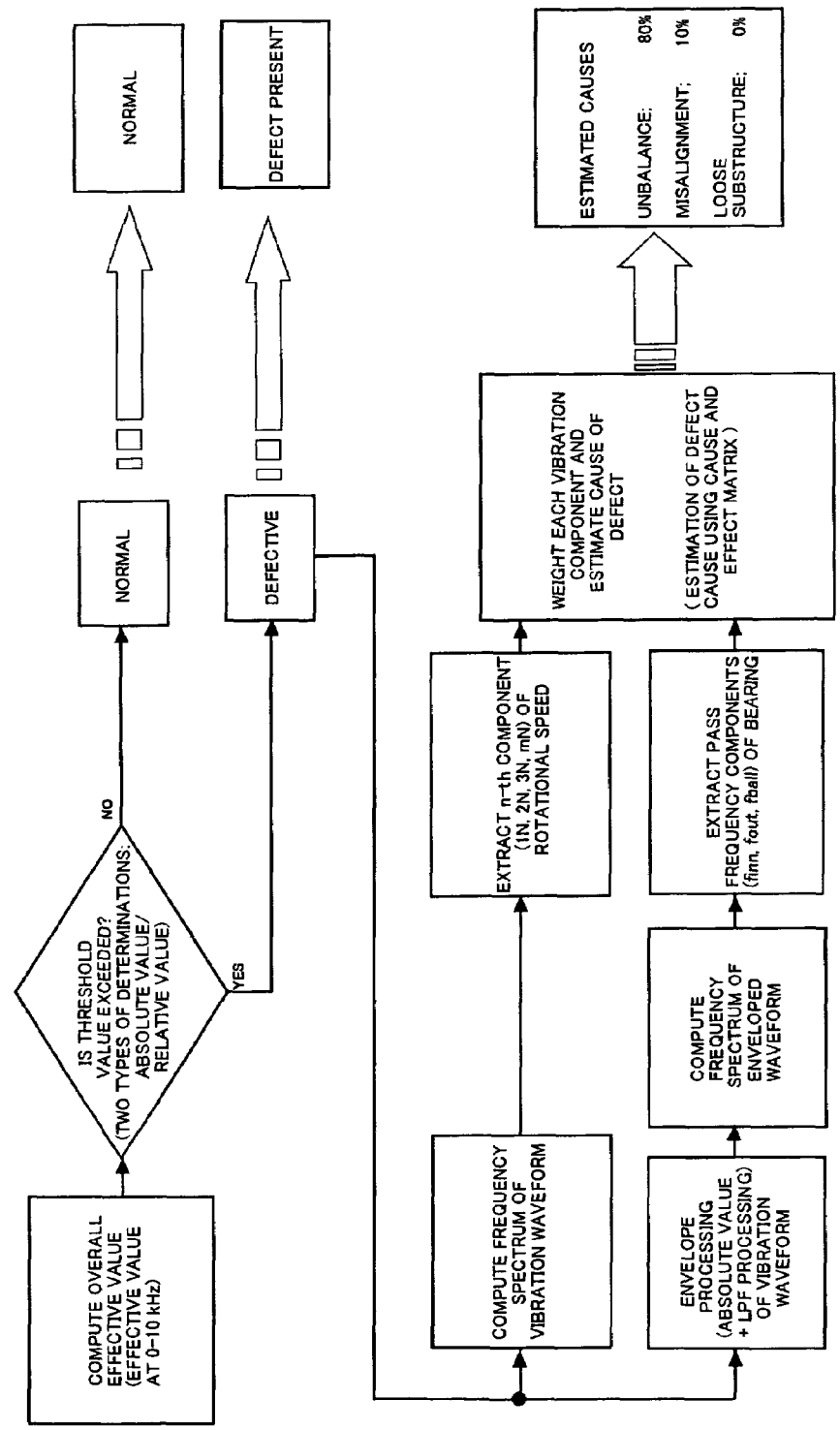
FIG. 12 is a flowchart illustrating the conventional method for assessing the remaining service life.

FIG. 11 is a block diagram of the structure of the device for assessing the remaining service life of a rolling bearing according to the present invention.

The device for assessing the remaining service life of a rolling bearing has an accelerometer (4), an analog/digital converter (5), a quantitative feature extraction unit (6), a measurement results database (7), a residual service life assessment unit (8), and an assessment results display (9), as well as an output unit for inspection schedules and diagnostic reports (10), and a transmission modem (11).

The analog/digital converter (5) converts data obtained by the accelerometer (4) on, e.g., a diagnostic rolling bearing (3) whose remaining service life is to be assessed as described above. The quantitative feature extraction unit (6) detects from among the vibration signals converted by the analog/digital converter (5) those signals in the resonance frequency band that are detectable at the highest sensitivity.

As described hereinabove, the data collected and stored in the measurement results database (7) are baseline data, which are acquired in advance using a testing machine, and which pertain to the relationship of the state of wear particle penetration and lubrication degradation to vibration and service life; data related to bearing load, rotational speed, operating time, and rolling bearing designation of diagnostic rolling bearings (3) whose remaining service time is to be assessed and which reside on rotating mechanism components of pumps, fans, or other rotating devices (1), electric motors (2), or the like; and vibration data obtained during normal operation of the diagnostic rolling bearing (3).

The residual service life assessment unit (8) uses the data stored in the measurement results database (7) to determine the state of lubrication degradation and wear particle penetration of the diagnostic rolling bearing (3) based on the vibration signals of the diagnostic rolling bearing (3) as extracted by the quantitative feature extraction unit (6), and assesses the remaining service life thereof.

The assessment results display (8) displays the results of the residual service life assessment unit (8). The output unit for inspection schedules and diagnostic reports (10) outputs the subsequent inspection schedules and assessment results reports for the diagnostic rolling bearing (3) to a printer (12) or the like based on the assessment results obtained from the residual service life assessment unit (8). The present invention, accordingly, estimates the service life of the rolling bearings (3) in mechanical rotating devices (1, 2) during operation. As a result, replacement cycles or replacement intervals are regularized in the output unit for inspection schedules and diagnostic reports (10), and devices can be maintained more efficiently. For instance, a schedule can be easily implemented to replace rolling bearings (3) of mechanical rotating devices (1, 2) in power plants in the autumn, instead of the summer, where operating rates are higher.

In a residual service life assessment unit of the above configuration, the state of degradation of the lubricant and contamination of the lubricant by wear particles can be detected in a cost-effective manner through the use of a resonance frequency band signal or high-frequency signal of an accelerometer (4), and the service life of a rolling bearing can be estimated with high precision on the basis of the detected state of the wear particles and lubricant.

The transmission modem (11) connects the waveform data and assessment results to an Internet link. The connection to the Internet link enables an estimate to be readily produced from a remote location for the remaining service life of a prescribed diagnostic rolling bearing (3).

The present invention is not limited to the aforedescribed embodiments. It shall be apparent that as long as the method involves estimating the remaining service life of a diagnostic rolling bearing (3), and computing the remaining service life of the diagnostic rolling bearing (3), no limitations shall be placed on the aforedescribed configuration, and any of a variety of modifications may be made, provided that no departure is made from the main point of the invention.

Furthermore, no limitations shall be placed on the configuration shown in the drawings, provided a structure is provided for which the following is true: Data are acquired in advance in regard to the relationship between the state of wear particle penetration or the state of lubricant degradation and the acceleration, indentation size, or the like; the state of wear particle penetration or lubricant degradation in the diagnostic rolling bearing (3) is estimated by comparing/determining the vibration signals of the diagnostic rolling bearing (3) extracted by the quantitative feature extraction unit (6) with the acquired data pertaining to the relationship between the state of wear particle penetration or lubricant degradation and the degree of acceleration and service life; and the remaining service life is assessed. It shall also be apparent that any of a variety of modifications may be made provided that no departure is made from the main point of the invention.

INDUSTRIAL APPLICABILITY

The method of the present invention for assessing the remaining service life of rolling bearings can be used to assess the remaining service life of rolling bearings in auxiliary pumps or fans used in chemical plants, steel plants, power plants, or other facilities; and rolling bearings used in motors for driving these devices.

The invention claimed is:

1. A method for assessing the remaining service life of a rolling bearing, characterized in comprising:
baseline data acquisition means for obtaining vibration signals by using an accelerometer (4) and using a testing device to acquire signals in a frequency band that includes resonance frequency band signals detectable at the highest sensitivity, for each specification such as model number, manufacturer name, and other specifications for a rolling bearing (3) as pertains to the relationship between the state of wear particle penetration in the rolling bearing (3) and the vibration/bearing service life, and to lubricant degradation and vibration/bearing service life;
measurement means whereby an accelerometer (4) is used to obtain vibration signals for the rolling bearing (3) whose remaining service life is being assessed and which resides on a fan, a pump, or another rotating device (1, 2), for the purpose of measuring signals in a frequency band that includes resonance frequency band signals detectable at the highest sensitivity; and
determination means for estimating the state of wear particle penetration and the state of lubricant degradation of said diagnostic rolling bearing (3), and computing the remaining service life of said diagnostic rolling bearing (3) by using measurement values obtained by said measurement means, determination results relating to said bearing specifications, and data obtained by said baseline data acquisition means; wherein
said determination means makes a determination regarding the model number, manufacturer name, and other bearing specifications for said diagnostic rolling bearing (3) after dividing the vibration waveform at 1 kHz to 6 kHz into ½-octave frequency bands to obtain a plurality of bands for said diagnostic rolling bearing (3), performing envelope processing for the waveforms of each frequency band, and computing a frequency spectrum.

2. The method for assessing the remaining service life of a rolling bearing according to claim 1, characterized in that said determination means divides the vibration waveform at 1 kHz to 64 kHz into ½-octave frequency bands to obtain a plurality of bands for said diagnostic rolling bearing (3), performs envelope processing for the waveforms of each frequency band, computes a frequency spectrum, and makes a determination regarding the model number, manufacturer name, and other bearing specifications; and
when the model number and manufacturer name of said diagnostic rolling bearing (3) are determined,
a bearing pass frequency is calculated from the bearing specifications, pass frequency components (the three components $f_{inn}$, $f_{out}$, $f_{ball}$) are extracted from the enveloped spectrum of each frequency band, relative sensitivities (ratios to normal) of the extracted pass frequency components in each frequency band are computed, and the relative sensitivities of the pass frequency components are averaged over the upper bands selected from the divided data bands;
a determination is made as to whether any of the upper-band averages of the pass frequency components in the divided bands exceed a threshold value; and
an estimation of "normal" is made when the threshold value is not exceeded.

3. The method for assessing the remaining service life of a rolling bearing according to claim 2, characterized in that
in said determination means, the vibration waveform at 5 kHz to 35 kHz is divided into ½-octave frequency bands to obtain a total of 6 bands for said diagnostic rolling bearing (3), envelope processing is performed for the waveforms of each frequency band, and a frequency spectrum is computed.

4. The method for assessing the remaining service life of a rolling bearing according to claim 2, characterized in that the threshold value in said determination means is a number greater than 1.

5. The method for assessing the remaining service life of a rolling bearing according to claim 1, characterized in that said determination means
divides the vibration waveform at 1 kHz to 64 kHz into ½-octave frequency bands to obtain a plurality of bands for said diagnostic rolling bearing (3);
performs envelope processing for the waveforms of each frequency band, computes a frequency spectrum; and
makes a determination regarding the model number, manufacturer name, and other bearing specifications; and
when the model number and manufacturer name of said diagnostic rolling bearing (3) are determined,
a frequency spectrum peak in the range of 1.6-7 times the rotational speed is extracted from the enveloped spectrum of each frequency band;
relative sensitivities (ratios to normal) of the peak frequency components of each extracted frequency band are computed;
the relative sensitivities of the peak frequency components are averaged over the top three bands;
a determination is made as to whether the relative sensitivity average of the upper bands obtained by dividing peak frequency components exceeds a threshold value; and
an estimation of "normal" is made when the threshold value is not exceeded.

6. The method for assessing the remaining service life of a rolling bearing according to claim 1, characterized in that said determination means divides the vibration waveform at 1 kHz to 64 kHz into ½-octave frequency bands to obtain a total of 6 bands for said diagnostic rolling bearing (3);

performs envelope processing for the waveforms of each frequency band to compute a frequency spectrum; and makes a determination regarding the model number, manufacturer name, and other bearing specifications; and when the model number and manufacturer name of said diagnostic rolling bearing (3) are not determined, a frequency spectrum peak in the range of 1.6-7 times the rotational speed is extracted from the enveloped spectrum of each frequency band;

relative sensitivities (ratios to normal) of the peak frequency components of each extracted frequency band are computed and the relative sensitivities of the peak frequency components are averaged over the top three bands; and a determination is made as to whether the relative sensitivity average the peak frequency components over the top three bands exceeds a threshold value.

7. The method for assessing the remaining service life of a rolling bearing according to claim 5, characterized in that the threshold value in said determination means is a number greater than 1.

8. A method for assessing the remaining service life of a rolling bearing, characterized in comprising:

baseline data acquisition means for obtaining vibration signals by using an accelerometer (4) and using a testing device to acquire signals in a frequency band that includes resonance frequency band signals detectable at the highest sensitivity, as pertains to the relationship between the state of wear particle penetration in a rolling bearing (3) and the vibration/bearing service life, and to lubricant degradation and vibration/bearing service life;

measurement means whereby an accelerometer (4) is used to obtain vibration signals for the rolling bearing (3) whose remaining service life is being assessed and which resides on a fan, a pump, or another rotating device (1, 2), for the purpose of measuring signals in a frequency band that includes resonance frequency band signals detectable at the highest sensitivity; and determination means for estimating the state of wear particle penetration and the state of lubricant degradation of said diagnostic rolling bearing (3), and computing the remaining service life of said diagnostic rolling bearing (3) by using measurement values obtained by said measurement means, and data obtained by said baseline data acquisition means; wherein said determination means calculates the relative sensitivity of an effective value in two frequency bands, which are a wide band and a narrow band that includes the sensor resonance frequency band, from vibration signals having a frequency band of 1 kHz to 64 kHz for said diagnostic rolling bearing (3); determines whether a quantitative feature that is the product of the relative sensitivity of a narrow-band effective value and the relative sensitivity of the wide-band effective value exceeds a threshold value; and makes a determination of "normal" when the threshold value is not exceeded.

9. The method for assessing the remaining service life of a rolling bearing according to claim 8, characterized in that said determination means calculates the relative sensitivity of an effective value in the two frequency bands of 23 kHz to 32 kHz and 5 kHz to 35 kHz from vibration signals having a frequency band of 5 kHz to 35 kHz for said diagnostic rolling bearing (3);

determines whether a quantitative feature that is the product of the relative sensitivity of the effective value at 23 kHz to 32 kHz and the relative sensitivity of the effective value at 5 kHz to 35 kHz exceeds a threshold value; and makes a determination of "normal" when the threshold value is not exceeded.

10. The method for assessing the remaining service life of a rolling bearing according to claim 9, characterized in that the threshold value in said determination means is a number greater than 1.

11. The method for assessing the remaining service life of a rolling bearing according to claim 2, characterized in that in said determination means, it is determined for said diagnostic rolling bearing (3) whether any of the upper-band averages of the pass frequency components in the divided bands exceed a threshold value; and when the threshold value is exceeded, a wavelet distribution of the vibration waveform is created in order to prevent misidentification of indentation/lubricant degradation;

the time frequency distribution (wavelet) is displayed; and the time frequency distribution (wavelet) is confirmed by a human.

12. The method for assessing the remaining service life of a rolling bearing according to claim 5, characterized in that in said determination means, it is determined for said diagnostic rolling bearing (3) whether the relative sensitivity average the peak frequency components over the top three bands exceeds a threshold value, and when the threshold value is exceeded, a wavelet distribution of the vibration waveform is created in order to prevent misidentification of indentation/lubricant degradation;

the time frequency distribution (wavelet) is displayed; and the time frequency distribution (wavelet) is confirmed by a human.

13. The method for assessing the remaining service life of a rolling bearing according to claim 8, characterized in that in said determination means, it is determined for said diagnostic rolling bearing (3) whether the product of the relative sensitivity of a wide-band effective value and the relative sensitivity of a narrow-band effective value exceeds a threshold value, and when the threshold value is exceeded, a wavelet distribution of the vibration waveform is created in order to prevent misidentification of indentation/lubricant degradation;

the time frequency distribution (wavelet) is displayed; and the time frequency distribution (wavelet) is confirmed by a human.

14. The method for assessing the remaining service life of a rolling bearing according to claim 2, characterized in that a determination is made in said determination means for said diagnostic rolling bearing (3) whether any of the upper-band averages of the pass frequency components in the divided bands exceed a threshold value, and when the threshold value is exceeded, the case of indentation-induced fatigue flaking is confirmed;

the indentation size is estimated from the relative sensitivity average of the top three bands; and the remaining service life in the case of indentation-induced fatigue flaking is calculated and assessed according to the equation [Eq. (1)] below;

$$L_{10} = L_{10h} \times 10^{(0.0038d \, log(P/C) - 0.272 \, log(d) + 0.416)}. \quad [\text{Eq. (1)}]$$

15. The method for assessing the remaining service life of a rolling bearing according to claim 5, characterized in that a determination is made in said determination means for said diagnostic rolling bearing (3) whether the relative sensitivity average the peak frequency components over the top three bands exceeds a threshold value, and when the threshold value is exceeded, the case of indentation-induced fatigue flaking is confirmed;

the indentation size is estimated from the relative sensitivity average of the top three bands; and the remaining service life in the case of indentation-induced fatigue flaking is calculated and assessed according to the equation [Eq. (1)] below;

$$L_{10} = L_{10h} \times 10^{(0.0038d\ log(P/C) - 0.272\ log(d) + 0.416)}. \quad [\text{Eq. (1)}]$$

16. The method for assessing the remaining service life of a rolling bearing according to claim 1, characterized in that in said determination means, the equation for estimating the remaining service life in the case of indentation-induced fatigue flaking is defined by letting the calculated service life be the basic dynamic service life rating in the equation [Eq. (2)] below, and letting the residual service life coefficient be the occurrence of indentations as a function of P/C and a vibration value;

$$L_{10h} = \frac{10^6}{60n}\left(\frac{C}{P}\right)^3. \quad [\text{Eq. (2)}]$$

17. The method for assessing the remaining service life of a rolling bearing according to claim 1, characterized in that in said determination means, the equation for estimating the remaining service life in the case of lubricant degradation is defined by letting the calculated service life be the calculated service life according to the equation [Eq. (3)] below, and letting the residual service life coefficient be the residual service life based on the occurrence of lubricant degradation as a function of the vibration value;

$$\log(L_{hb}) = -2.30 + \frac{2450}{273+t} - 0.301(S_G + S_N + S_W). \quad [\text{Eq. (3)}]$$

18. The method for assessing the remaining service life of a rolling bearing according to claim 8, characterized in that said determination means computes for said diagnostic rolling bearing (3) the relative sensitivity of an effective value in the sensor resonance frequency band of 23 kHz to 32 kHz and an effective value at 5 kHz to 35 kHz; and determines whether the product of the relative sensitivity of the effective value at 23 kHz to 32 kHz and the relative sensitivity of the effective value at 5 kHz to 35 kHz exceeds a threshold value; and when the threshold value is exceeded, the case of lubricant degradation is confirmed; and the remaining service life in the case of lubricant degradation is calculated and assessed according to the equation [Eq. (4)] below from the relative sensitivity of the effective value at 23 kHz to 32 kHz;

$$L = L_{hb} \times V_r^{-4.44}. \quad [\text{Eq. (4)}]$$

19. The method for assessing the remaining service life of a rolling bearing according to claim 1, characterized in that said determination means computes a cepstrum of a vibration waveform at 1 kHz to 64 kHz for said diagnostic rolling bearing (3);

computes the kurtosis of the cepstrum;

determines whether the kurtosis of the cepstrum exceeds a threshold value;

determines that the case of indentation-induced fatigue flaking is in effect when the threshold value is exceeded; and assesses that the case of lubricant degradation is in effect when the threshold value is not exceeded.

20. The method for assessing the remaining service life of a rolling bearing according to claim 19, characterized in that the threshold value in said determination means is a number greater than 3.

21. The method for assessing the remaining service life of a rolling bearing according to claim 3, characterized in that when a determination is made in said determination means that the case of indentation-induced fatigue flaking is in effect and said threshold value is exceeded for said diagnostic rolling bearing (3), the indentation size is estimated from the relative sensitivity average of the top three bands;

the remaining service life in the case of indentation-induced fatigue flaking is assessed;

and the remaining service life is expressed in units of time.

22. The method for assessing the remaining service life of a rolling bearing according to claim 8, characterized in that when a determination is made in said determination means that the case of lubricant degradation is in effect and said threshold value is not exceeded for said diagnostic rolling bearing (3), severity of lubricant degradation is estimated from the effective value of said diagnostic rolling bearing (3) at 23 kHz to 32 kHz;

the remaining service life in the case of lubricant degradation is assessed; and the remaining service life is expressed in units of time.

23. The method for assessing the remaining service life of a rolling bearing according to claim 1, characterized in that the band of 5 kHz to 35 kHz is divided into 6 frequency bands and an enveloped spectrum is computed in said determination means for said diagnostic rolling bearing (3) in order to detect indentations for measuring the vibration waveform at 5 kHz to 35 kHz;

a determination is made as to whether the enveloped spectrum exceeds a threshold value; and an estimation of "normal" is made when the threshold value is not exceeded; and when the threshold value is exceeded, a defect is estimated to be present even though the type of defect/failure cannot be specified for the case of indentation-induced fatigue flaking.

24. The method for assessing the remaining service life of a rolling bearing according to claim 8, characterized in that in said determination means, a quantitative feature (product of an effective value at 23 kHz to 32 kHz and an effective value at 5 kHz to 35 kHz) is computed in order to detect lubricant degradation for said diagnostic rolling bearing (3);

a determination is made as to whether the quantitative feature of the lubricant degradation exceeds a threshold value; and an estimation of "normal" is made when the threshold value is not exceeded; and when the threshold value is exceeded, a defect is estimated to be present even though the type of defect/failure cannot be specified for the case of lubricant degradation.

25. The method for assessing the remaining service life of a rolling bearing according to claim 24, characterized in that the threshold value in said determination means is 2.0.

26. The method for assessing the remaining service life of a rolling bearing according to claim 1, characterized in that in said determination means, a quantitative feature (kurtosis of the cepstrum) for said diagnostic rolling bearing (3) is computed in order to distinguish between indentations and lubricant degradation, and a determination is made as to whether the kurtosis of the cepstrum exceeds a threshold value; and when the threshold value is exceeded, a determination is made that there is a defect of indentation-induced fatigue flaking; and when the threshold value is not exceeded, an estimate is made that there is a defect of lubricant degradation.

27. The method for assessing the remaining service life of a rolling bearing according to claim 26, characterized in that the threshold value in said determination means is 3.8.

28. The method for assessing the remaining service life of a rolling bearing according to claim 1, characterized in that a need for caution is recognized;

the amount of indentations, the amount of lubricant degradation, and the identified amount of indentations/lubrication are specified; and a time frequency distribution (wavelet) is displayed in said determination means when the type of failure cannot be specified and the result of detecting indentations for the diagnostic rolling bearing (3) exceeds a threshold value, or when the type of failure cannot be specified and the result of detecting lubricant degradation exceeds a threshold value; and the type of failure is determined and assessed by a human.

29. The method for assessing the remaining service life of a rolling bearing according to claim 1, characterized in that a determination is made in said determination means that there is a defect of indentation-induced fatigue flaking;

a determination is made that indentation has occurred; and the remaining service life in the case of indentation-induced fatigue flaking is assessed when the result of detecting indentations for the diagnostic rolling bearing (3) exceeds a threshold value, and the kurtosis of the cepstrum exceeds a threshold value.

30. The method for assessing the remaining service life of a rolling bearing according to claim 8, characterized in that a determination is made in said determination means that there is a defect of lubricant degradation;

a determination is made that lubricant degradation has occurred; and the remaining service life in the case of lubricant degradation is assessed when the result of detecting lubricant degradation for the diagnostic rolling bearing (3) exceeds a threshold value, and the kurtosis of the cepstrum does not exceed a threshold value.

31. The method for assessing the remaining service life of a rolling bearing according to claim 1, characterized in that a need for caution is recognized;

the amount of indentations, the amount of lubricant degradation, and the identified amount of indentations/lubrication are specified;

a time frequency distribution (wavelet) is displayed; and the type of failure is determined and assessed by a human in said determination means when there is a defect of indentation-induced fatigue flaking, or a determination is made that there is a defect of lubricant degradation in the diagnostic rolling bearing (3).

32. The method for assessing the remaining service life of a rolling bearing according to claim 4, characterized in that the threshold value for detecting indentations and lubricant degradation in said determination means is varied according to (a) the BRG size, (b) machine weight, (c) electric motor output, (d) machine type, and (e) a combination of factors (a) through (d).

* * * * *